US012424150B2

(12) United States Patent
Zhong et al.

(10) Patent No.: US 12,424,150 B2
(45) Date of Patent: Sep. 23, 2025

(54) DISPLAY PANEL AND DISPLAY DEVICE

(71) Applicant: WUHAN CHINA STAR OPTOELECTRONICS TECHNOLOGY CO., LTD., Hubei (CN)

(72) Inventors: Li Zhong, Hubei (CN); Chao Tian, Hubei (CN); Zhou Zhou, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 18/567,500

(22) PCT Filed: Nov. 13, 2023

(86) PCT No.: PCT/CN2023/131157
§ 371 (c)(1),
(2) Date: Dec. 6, 2023

(87) PCT Pub. No.: WO2025/091564
PCT Pub. Date: May 8, 2025

(65) Prior Publication Data
US 2025/0148960 A1 May 8, 2025

(30) Foreign Application Priority Data
Nov. 3, 2023 (CN) ......................... 202311475989.7

(51) Int. Cl.
*G09G 3/32* (2016.01)
*G09G 3/20* (2006.01)

(52) U.S. Cl.
CPC ............. *G09G 3/32* (2013.01); *G09G 3/2018* (2013.01); *G09G 2300/0819* (2013.01);
(Continued)

(58) Field of Classification Search
CPC ..................... G09G 2300/0861; G09G 3/2018
See application file for complete search history.

(56) References Cited

U.S. PATENT DOCUMENTS 11,815,692 B1 * 11/2023 Pickett ............... G02B 27/0176
12,008,950 B1 * 6/2024 Zhong ...................... G09G 3/32
(Continued)

FOREIGN PATENT DOCUMENTS

CN 111477165 A 7/2020
CN 116312316 A 6/2023
CN 116798343 A 9/2023

OTHER PUBLICATIONS

International Search Report in International application No. PCT/CN2023/131157, mailed on Aug. 2, 2024.
(Continued)

*Primary Examiner* — William Boddie
*Assistant Examiner* — Bipin Gyawali
(74) *Attorney, Agent, or Firm* — Geoffrey Lottenberg; Berger Singerman LLP

(57) ABSTRACT

The present application provides a display panel and a display device. Pulse width modulation modules of a plurality of sub-pixels included in the same sub-pixel group receive the same frequency sweep signal, and pulse width modulation modules and the pulse amplitude modulation modules of the plurality of sub-pixels included in the same sub-pixel group receive the same light emission control signal. The start time when pixel driving circuits of at least two of the sub-pixel groups provide flow paths for corresponding driving currents according to corresponding light emission control signals is different.

10 Claims, 14 Drawing Sheets

(52) U.S. Cl.
CPC ............... *G09G 2300/0852* (2013.01); *G09G 2300/0861* (2013.01); *G09G 2310/08* (2013.01); *G09G 2320/0223* (2013.01); *G09G 2320/0233* (2013.01); *G09G 2320/045* (2013.01)

(56) References Cited

U.S. PATENT DOCUMENTS

| | | | | |
|---|---|---|---|---|
| 2018/0130423 | A1* | 5/2018 | Kim | H10K 59/124 |
| 2020/0111404 | A1* | 4/2020 | Kim | G09G 3/2014 |
| 2021/0407419 | A1* | 12/2021 | Li | G09G 3/3258 |
| 2022/0199020 | A1 | 6/2022 | You | |
| 2022/0215796 | A1* | 7/2022 | Zhai | G09G 3/32 |
| 2022/0335892 | A1* | 10/2022 | Zhang | G09G 3/3275 |
| 2023/0012711 | A1* | 1/2023 | Kim | H01L 25/0753 |
| 2023/0080385 | A1 | 3/2023 | Yuan et al. | |
| 2023/0206788 | A1* | 6/2023 | Yang | G09F 9/3026 257/79 |
| 2024/0038170 | A1* | 2/2024 | Zhai | G09G 3/32 |
| 2024/0258479 | A1* | 8/2024 | Sun | H10D 86/60 |
| 2024/0363055 | A1* | 10/2024 | Zhang | G09G 3/3233 |
| 2025/0006133 | A1* | 1/2025 | Feng | G09G 3/3266 |

OTHER PUBLICATIONS

Written Opinion of the International Search Authority in International application No. PCT/CN2023/131157, mailed on Aug. 2, 2024.

* cited by examiner

[FIG. 1A]
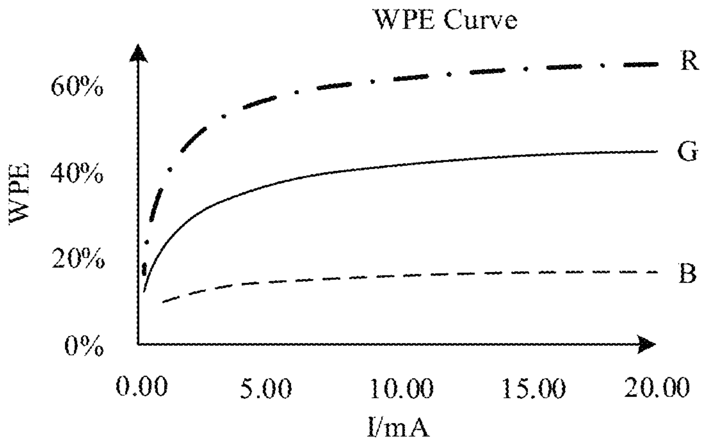
[FIG. 1B]
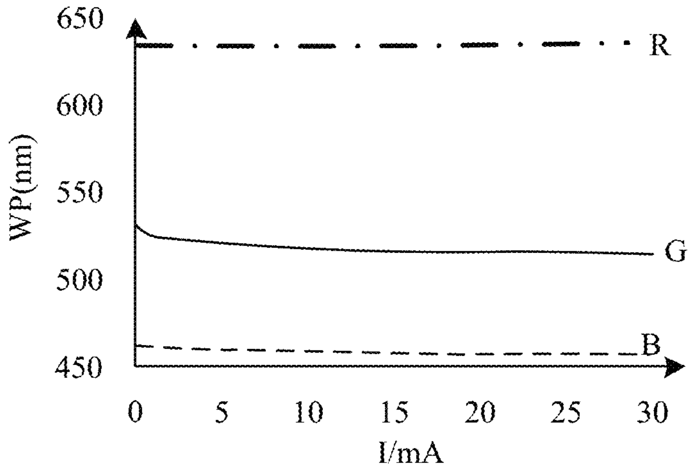
[FIG. 2]
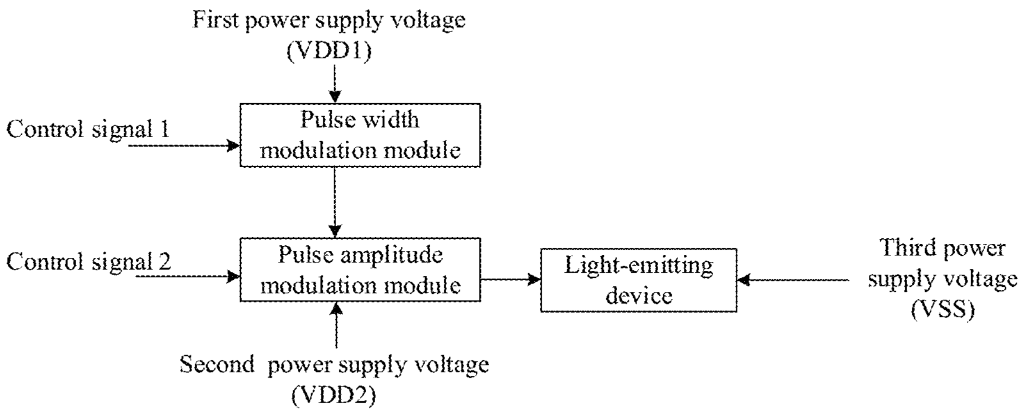

[FIG. 3]
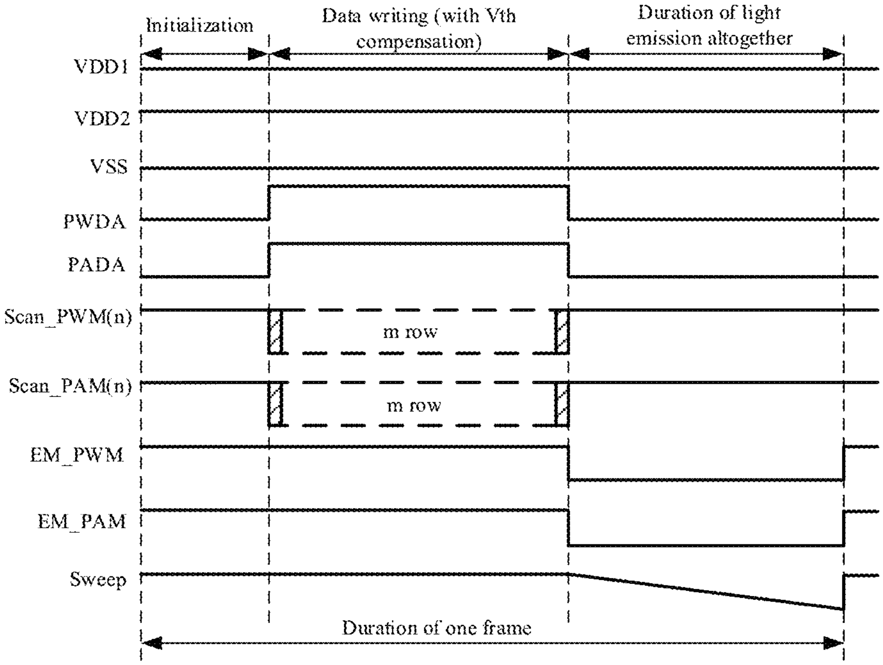

[FIG. 4A]
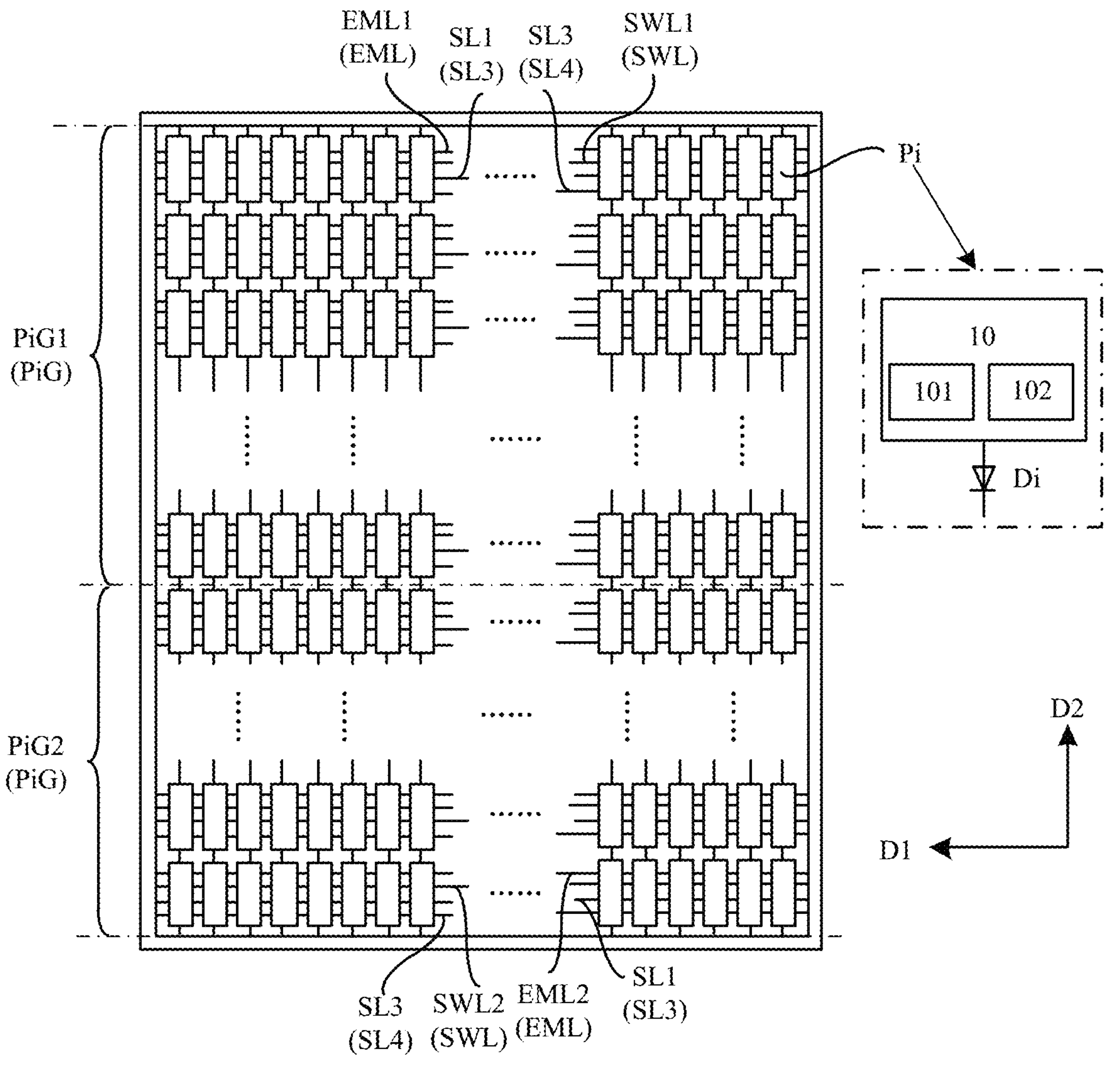

[FIG. 4B]
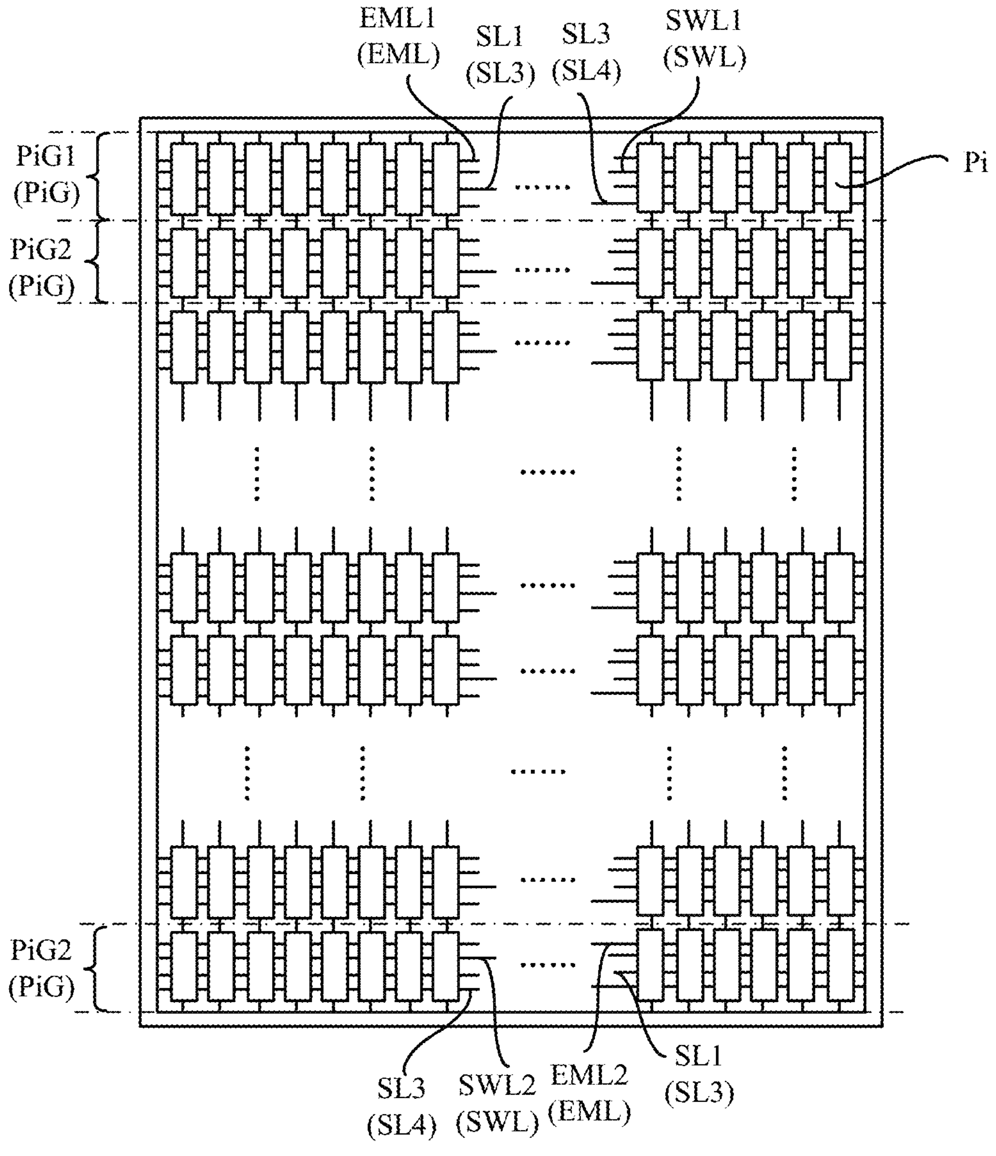

[FIG. 4C]
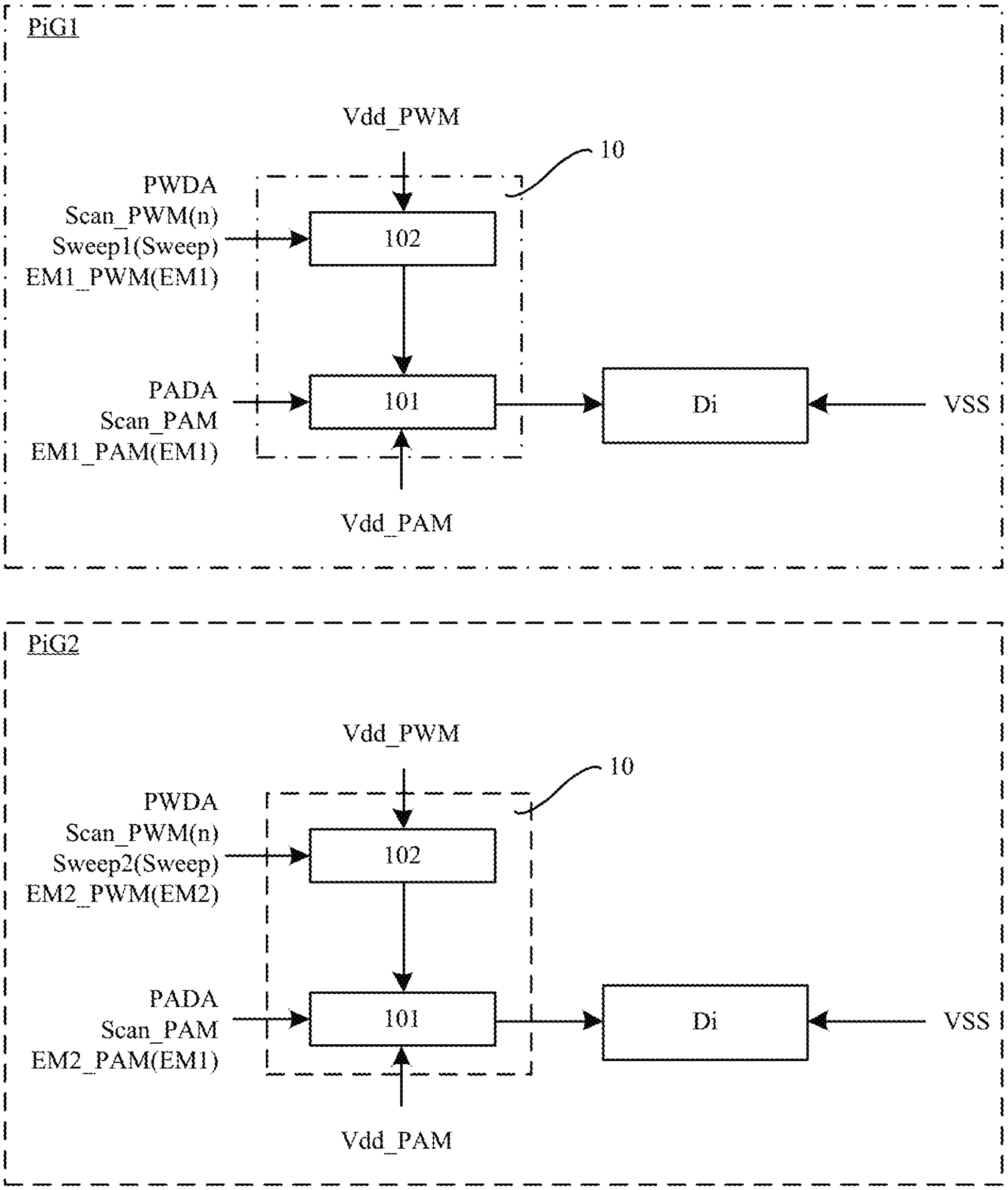

[FIG. 5A]
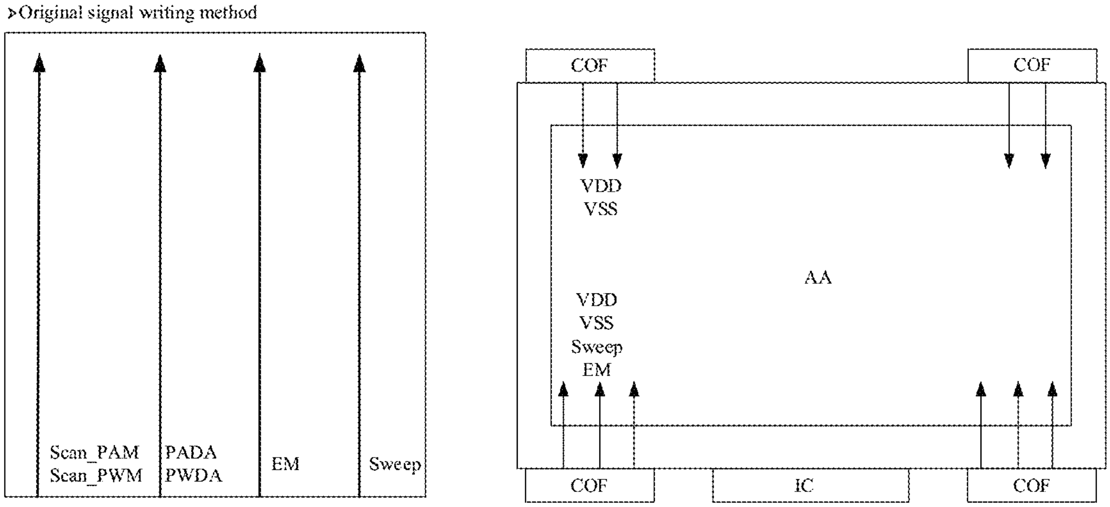
[FIG. 5B]
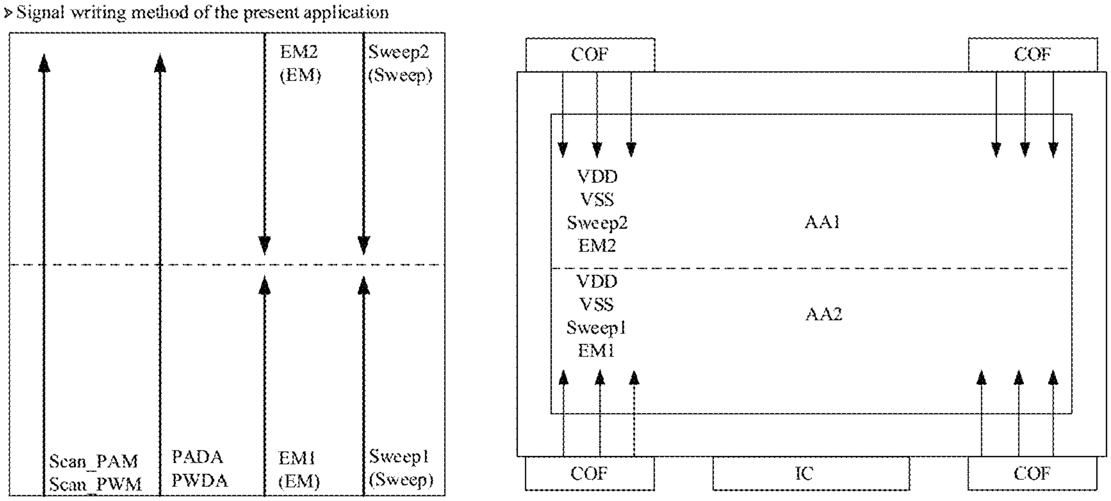

[FIG. 6A]
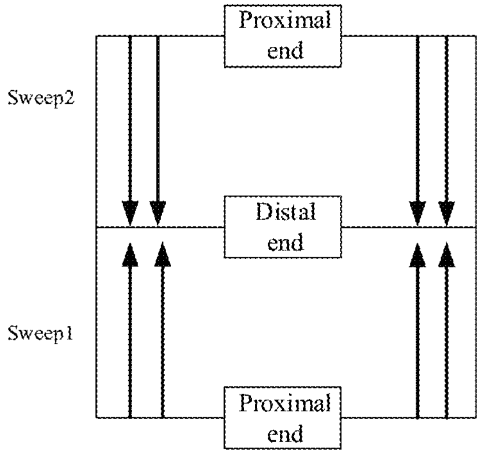
[FIG. 6B]
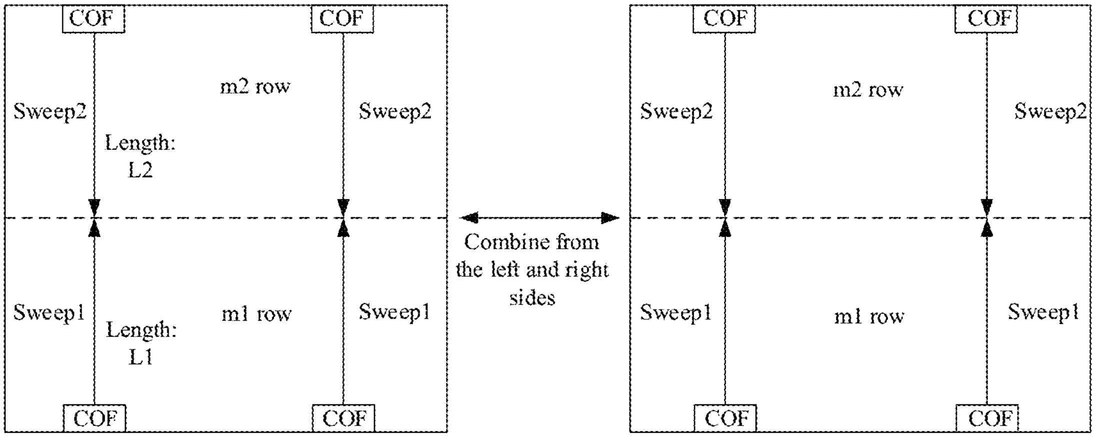
[FIG. 6C]
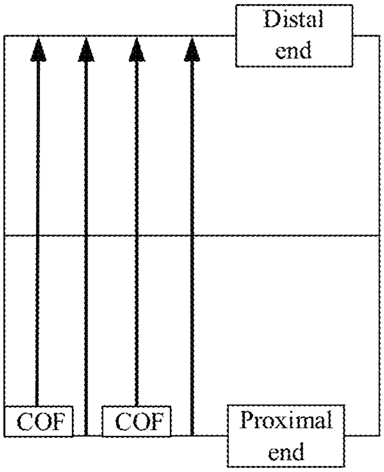

[FIG. 6D]
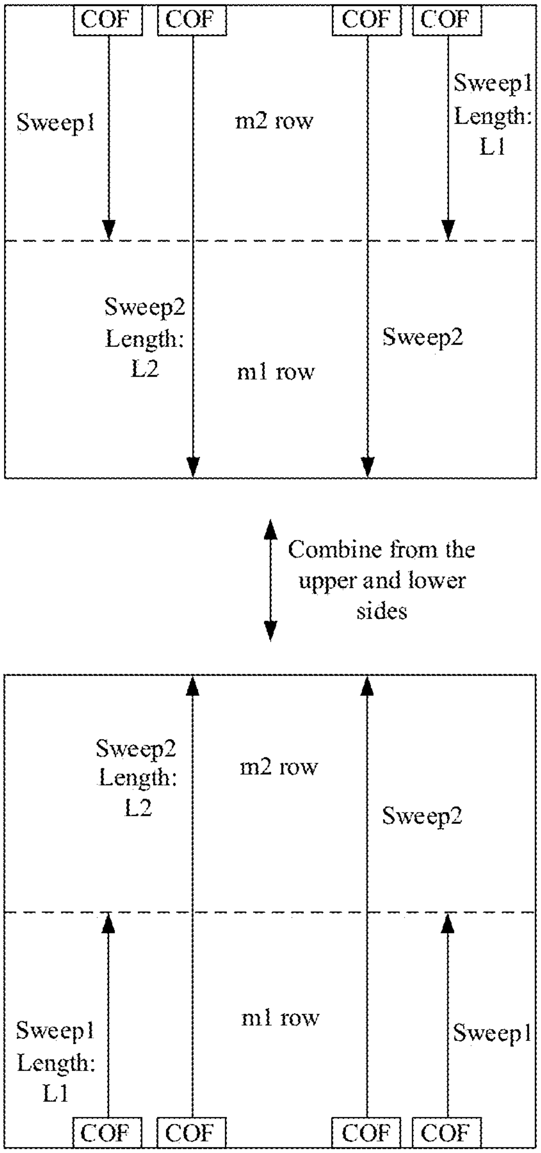

[FIG. 6E]
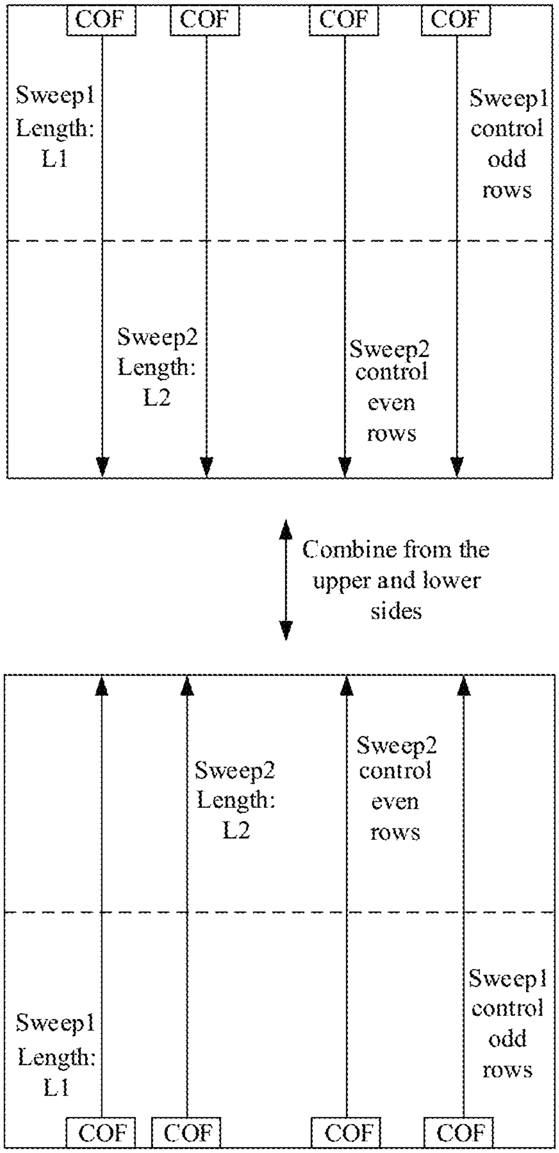

[FIG. 7A]
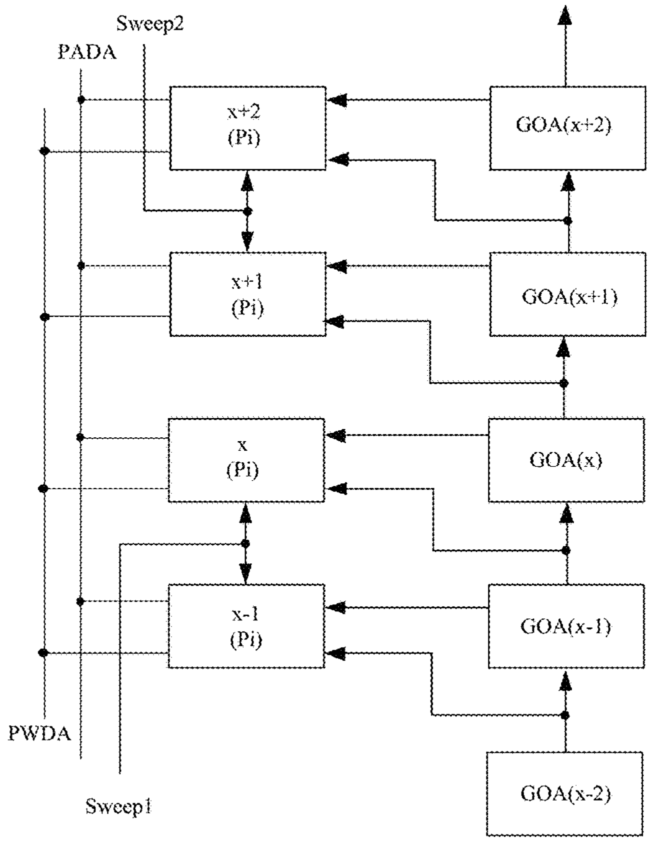
[FIG. 7B]
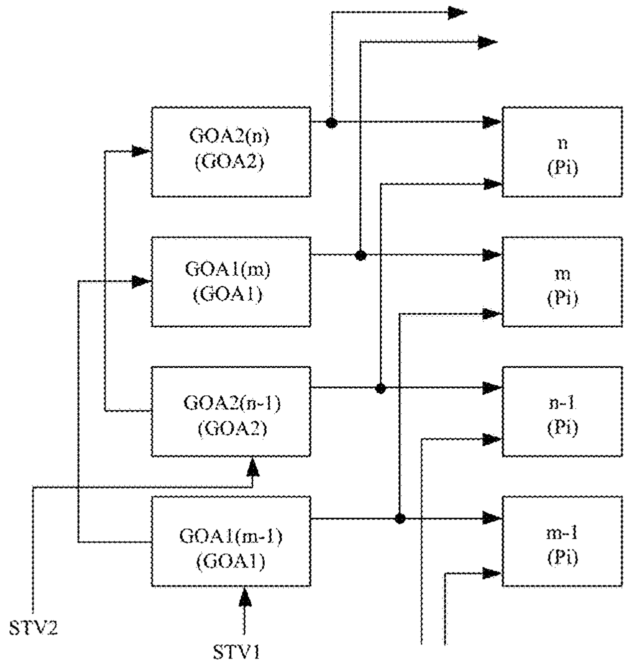

[FIG. 8]
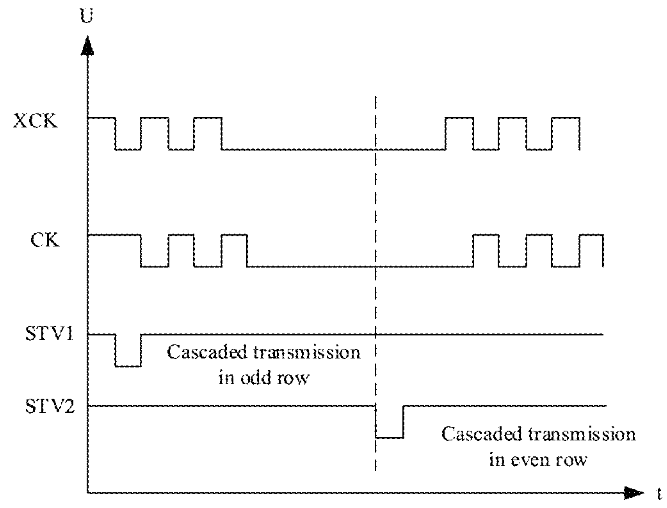
[FIG. 9A]
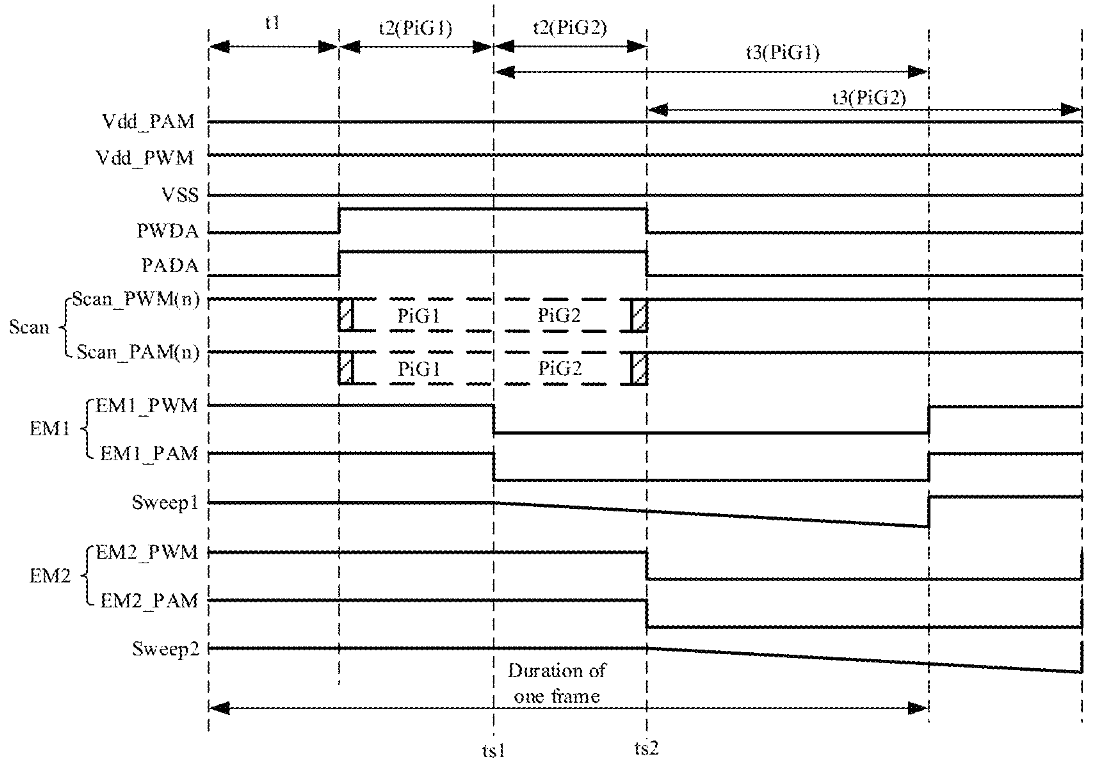

[FIG. 9B]
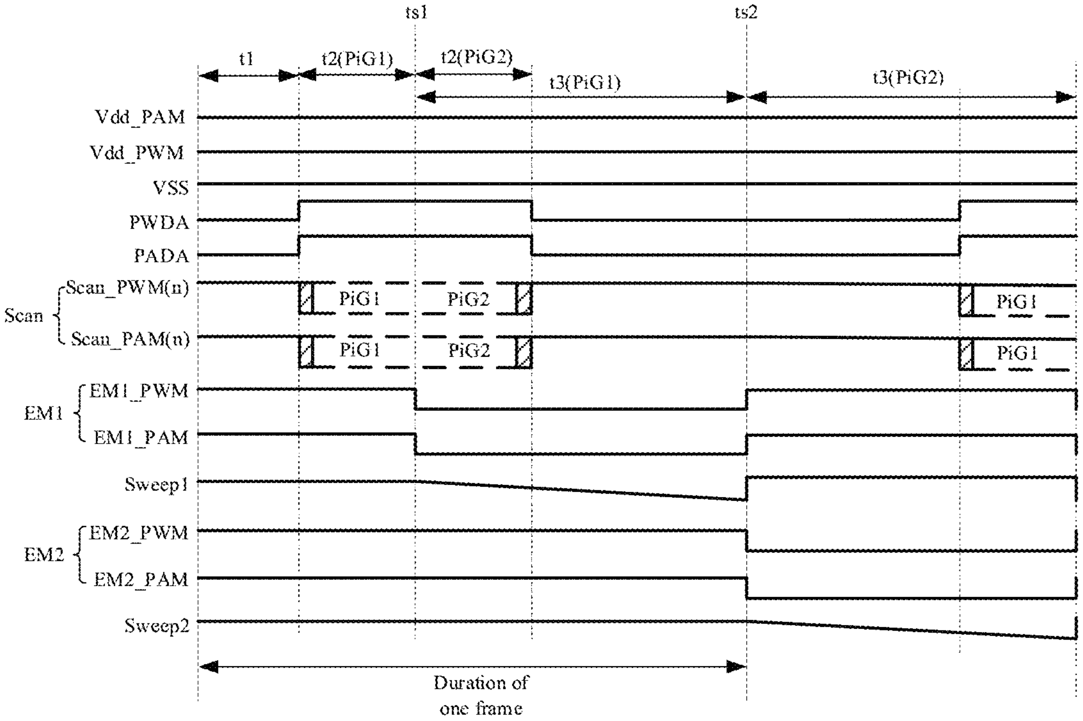

[FIG. 10]
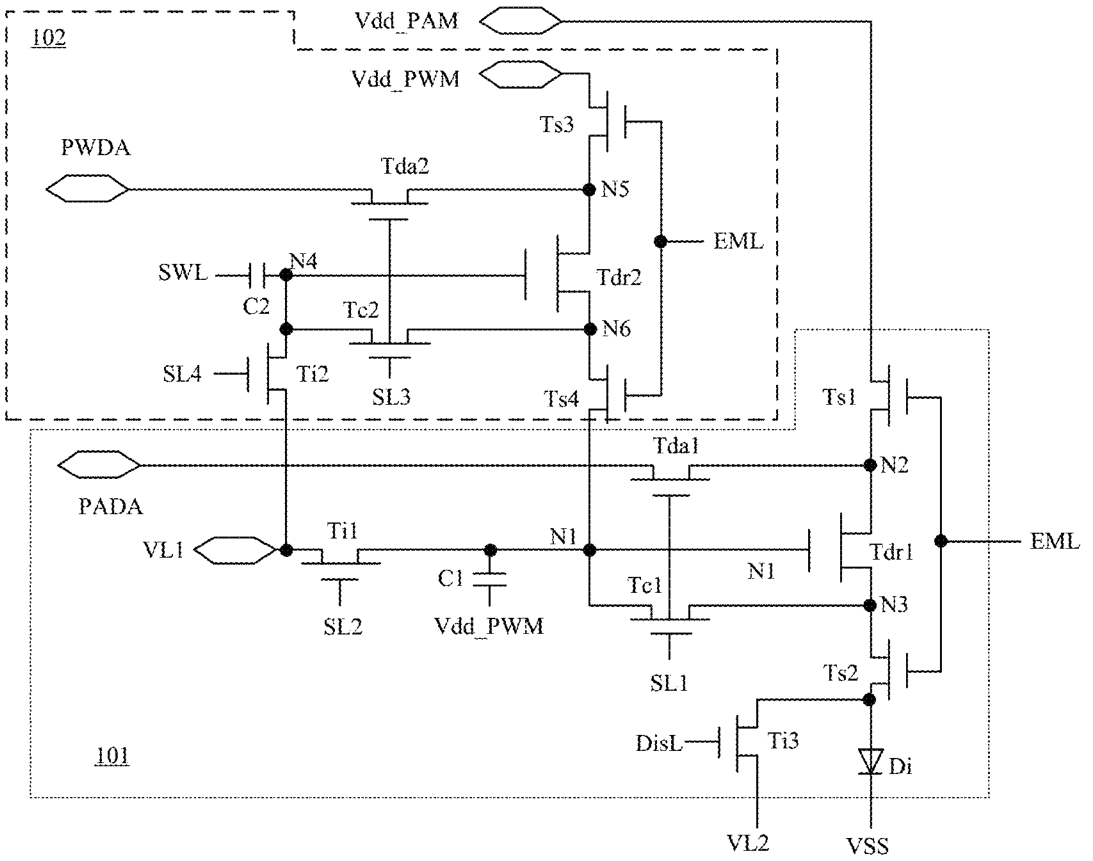

[FIG. 11]
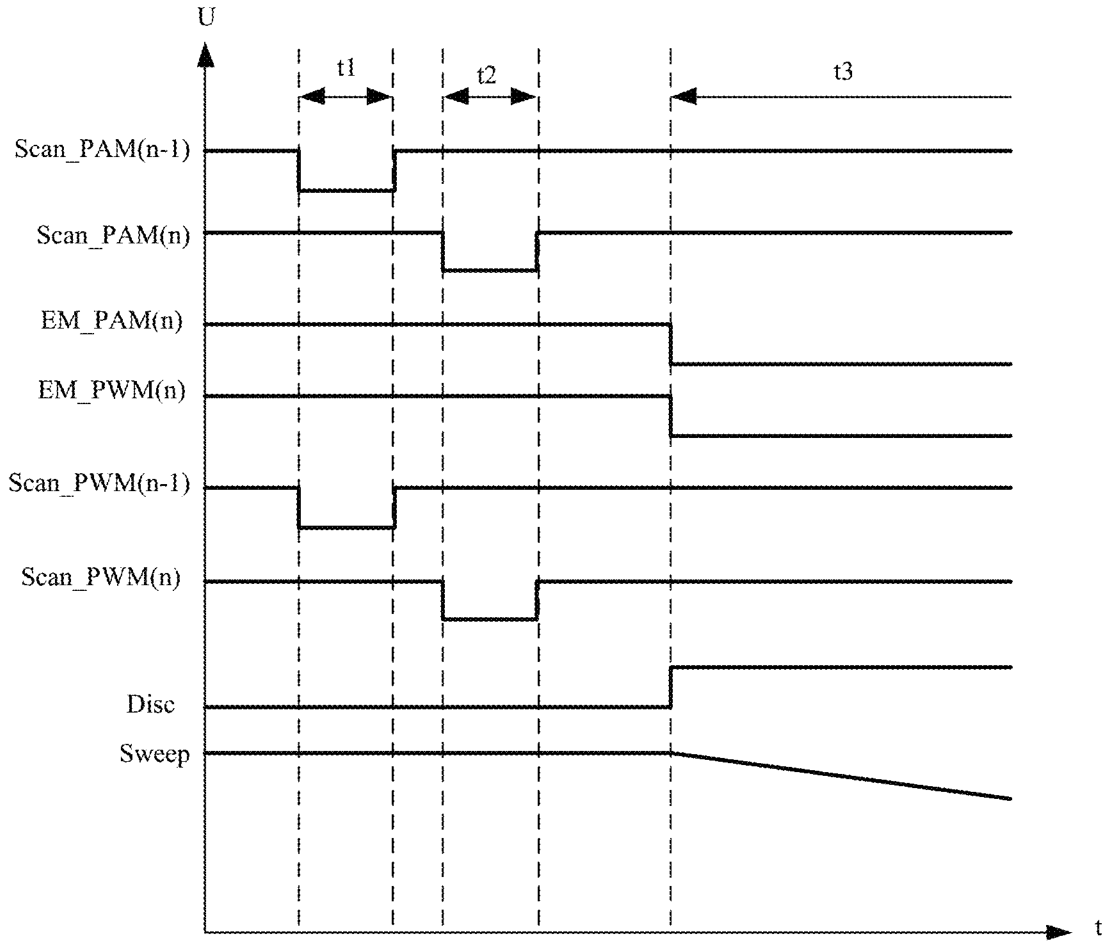

DISPLAY PANEL AND DISPLAY DEVICE

TECHNICAL FIELD

The present application relates to display technologies, and more particularly to a display panel and a display device.

BACKGROUND ARTS

A hybrid driving framework combining Pulse Amplitude Modulation (PAM) and Pulse Width Modulation (PWM) has become a driving solution the industry is rushing to develop because it can improve the drifting of characteristic of micro-light-emitting diodes and improve gray-scale segmentation capabilities.

However, the hybrid driving framework is usually of a synchronous light-emission mode (that is, it needs to finish data writing for all rows of sub-pixels and then make all rows of sub-pixels emit light altogether under the control of a global frequency sweep signal "sweep"). In the synchronous light-emission mode, the duration of light emission within one frame is affected by the duration of data writing. A short duration of light emission requires high driving current and it is no good for voltage drop, making it difficult to achieve high resolution.

SUMMARY

Embodiments of the present application provide a display panel and a display device, which are beneficial for the design of the display panel to achieve high resolution.

The embodiments of the present application provide a display panel including a plurality of light emission lines, a plurality of frequency sweep lines and a plurality of sub-pixel groups. The plurality of light emission lines are configured to transmit a plurality of light emission control signals. The plurality of frequency sweep lines are configured to transmit a plurality of frequency sweep signals. Each of the sub-pixel groups includes a plurality of sub-pixels, and each of the sub-pixels includes a light-emitting device and a pixel driving circuit. The pixel driving circuit is configured to provide a flow path according to a corresponding light emission control signal for a driving current driving the light-emitting device to emit light, the pixel driving circuit includes a pulse amplitude modulation module and a pulse width modulation module, the pulse amplitude modulation module is configured to receive a corresponding pulse amplitude modulation voltage to control a pulse amplitude of the driving current; the pulse width modulation module is configured to control a pulse width of the driving current by cooperating with the pulse amplitude modulation module according to a corresponding frequency sweep signal and pulse width modulation voltage when the pixel driving circuit provides the flow path for the driving current according to the corresponding light emission control signal. The pulse width modulation modules of the plurality of sub-pixels included in the same sub-pixel group are used to receive the same frequency sweep signal, and the pulse width modulation modules and the pulse amplitude modulation modules of the plurality of sub-pixels included in the same sub-pixel group are used to receive the same light emission control signal; the start time when the pixel driving circuits of at least two of the sub-pixel groups provide the flow paths for corresponding driving currents according to the corresponding light emission control signals is different.

The present application further provides a display device including any of the afore-described display panel.

Beneficial Effects

Compared to the existing arts, in the display panel and the display device provided in the embodiments of the present application, the pulse width modulation modules of the plurality of sub-pixels included in the same sub-pixel group receive the same frequency sweep signal, and the pulse width modulation modules and the pulse amplitude modulation modules of the plurality of sub-pixels included in the same sub-pixel group receive the same light emission control signal; the start time when the pixel driving circuits of at least two of the sub-pixel groups provide the flow paths for corresponding driving currents according to the corresponding light emission control signals is different. In this way, the plurality of sub-pixels included in the same sub-pixel group emit light synchronously, and the plurality of sub-pixels included in at least two sub-pixel groups start to emit light at different start time points such that it does not need for the display panel to finish data writing for all sub-pixels and then make all the rows of sub-pixels emit light altogether under the control of a global frequency sweep signal. It facilitates the control of duration of light emission of the sub-pixels of the at least two sub-pixel groups such that the display panel can achieve high resolution.

DESCRIPTION OF DRAWINGS

FIG. 1A shows curves of electro-optical conversion efficiency vs. driving current for sub-pixels emitting different colors of light.

FIG. 1B shows curves of light wavelength vs. driving current for sub-pixels emitting different colors of light.

FIG. 2 is a schematic diagram illustrating a driving framework of the display panel.

FIG. 3 is a timing diagram corresponding to the driving framework of the display panel illustrated in FIG. 2.

FIGS. 4A to 4B are schematic structural diagrams illustrating a display panel provided in embodiments of the present application.

FIG. 4C is a schematic diagram illustrating a driving framework of a display panel provided in an embodiment of the present application.

FIGS. 5A to 5B are schematic diagrams illustrating a comparison of signal writing methods of a display panel provided in an embodiment of the present application.

FIGS. 6A to 6E are schematic diagrams illustrating a comparison of display panel combining methods provided in an embodiment of the present application.

FIGS. 7A to 7B are schematic structural diagrams illustrating a gate driving unit provided in an embodiment of the present application.

FIG. 8 is a timing diagram corresponding to the gate driving unit shown in FIG. 7B.

FIGS. 9A to 9B are timing diagrams corresponding to the driving framework of the display panel illustrated in FIG. 4B.

FIG. 10 is a schematic structural diagram illustrating a pixel driving circuit provided in an embodiment of the present application.

FIG. 11 is a diagram illustrating the timing corresponding to the pixel driving circuit shown in FIG. 10.

DESCRIPTION OF EMBODIMENTS OF THE INVENTION

To make the objectives, technical schemes, and effects of the present application more clear and specific, the present application is described in further detail below with reference to the embodiments in accompanying with the appending drawings. It should be understood that the specific embodiments described herein are merely for interpreting the present application and the present application is not limited thereto.

Specifically, FIG. 1A shows curves of electro-optical conversion efficiency vs. driving current for sub-pixels emitting different colors of light, and FIG. 1B shows curves of light wavelength vs. driving current for sub-pixels emitting different colors of light. WPER represents electro-optical conversion efficiency.

In a display panel with sub-pixels made by inorganic light-emitting devices (including micro-light-emitting diodes emitting red, green and blue colors of light), the light-emission efficiency of the light-emitting devices and the wavelength of emitted light will change according to the intensity or amplitude of the driving current I. This reduces the reproducibility of image color. Therefore, the Pulse Amplitude Modulation (PAM) method applied in organic light-emitting devices (such as organic light-emitting diodes) to achieve gray-scale performance of sub-pixels is no longer suitable for display panels using micro-light-emitting devices.

The Pulse Width Modulation (PWM) method to achieve gray-scale segmentation by changing the duration of light-emission while fixing the driving current I can improve the problem that the light-emission efficiency and emitted light wavelength of micro-light-emitting devices drift as the driving current I changes. FIG. 2 is a schematic diagram illustrating a driving framework of the display panel. Considering that pure pulse width modulation can achieve the gray-scale segmentation with limited number of levels, a hybrid driving scheme achieved by combining the pulse width modulation and the pulse amplitude modulation can not only solve the drifting of characteristic of micro-light-emitting devices but also improve gray-scale segmentation capabilities. The control signals 1 include a pulse width modulation voltage PWDA, a gate control signal Scan_PWM(n) acting on a pulse width modulation module, a frequency sweep signal Sweep and a light-emission control signal EM_PWM, etc.; and the control signals 2 include a pulse amplitude modulation voltage PADA, a gate control signal Scan_PAM(n) acting on a pulse amplitude modulation module, and a light-emission control signal EM_PAM, etc.

FIG. 3 is a timing diagram corresponding to the driving framework of the display panel illustrated in FIG. 2. Vth represents a threshold voltage. The hybrid driving scheme shown in FIG. 2 is usually of a synchronous light-emission mode (that is, it needs to finish data writing for all rows (e.g., m rows) of sub-pixels and then make all the rows emit light altogether under the control of a global frequency sweep signal "sweep"). This causes the duration of light emission within one frame for the sub-pixels to be affected by the duration of data writing. A short duration of light emission requires high driving current and it is no good for voltage drop, making it difficult to achieve high resolution. Therefore, in order to allow the display panel to achieve high resolution, the present application provides a display panel and a display device.

FIGS. 4A to 4B are schematic structural diagrams illustrating a display panel provided in embodiments of the present application, and FIG. 4C is a schematic diagram illustrating a driving framework of a display panel provided in an embodiment of the present application. The embodiments of the present application provide a display panel including a plurality of light emission lines EML, a plurality of frequency sweep lines SWL and a plurality of sub-pixel groups PiG.

The plurality of light emission lines EML are configured to transmit a plurality of light emission control signals EM. Optionally, each of the light emission lines EML extends along a first direction D1, and the plurality of the light emission lines EML are arranged along a second direction D2.

The plurality of frequency sweep lines SWL are configured to transmit a plurality of frequency sweep signals Sweep. Optionally, the plurality of frequency sweep signals Sweep can be generated by a driver chip.

Each of the sub-pixel groups PiG includes a plurality of sub-pixels Pi, and each of the sub-pixels Pi includes a light-emitting device Di and a pixel driving circuit 10.

Optionally, the light-emitting device D1 includes a sub-millimeter light-emitting diode, a micro light-emitting diode, etc.

The pixel driving circuit 10 is configured to provide a flow path for a driving current that drives the light-emitting device Di to emit light according to a corresponding light emission control signal EM. The pixel driving circuit 10 includes a pulse amplitude modulation module 101 and a pulse width modulation module 102.

The pulse amplitude modulation module 101 is configured to receive a corresponding pulse amplitude modulation voltage PADA to control a pulse amplitude of the driving current; the pulse width modulation module 102 is configured to control a pulse width of the driving current via the pulse amplitude modulation module 101 according to a corresponding frequency sweep signal Sweep and a corresponding pulse width modulation voltage PWDA when the pixel driving circuit 10 provides a flow path for the driving current according to a corresponding light emission control signal EM.

The pulse width modulation module 102 of the plurality of sub-pixels Pi included in the same sub-pixel group PiG is used to receive the same frequency sweep signal Sweep. The pulse width modulation module 102 and the pulse amplitude modulation module 101 of the plurality of sub-pixels Pi included in the same sub-pixel group PiG are used to receive the same light emission control signal EM; the pixel driving circuits 10 included in the at least two sub-pixel groups PiG provide flow paths for corresponding driving currents at different start time points according to the corresponding light emission control signals EM such that the plurality of sub-pixels Pi included in the same sub-pixel group PiG emit light synchronously and the plurality of sub-pixels Pi included in at least two pixel groups PiG start to emit light at different start time points. In this way, it does not need for the display panel to finish data writing for all sub-pixels and then make all the rows of sub-pixels Pi emit light altogether under the control of a global frequency sweep signal. It facilitates the control of duration of light emission of the sub-pixels Pi of the at least two sub-pixel groups PiG such that the display panel can achieve high resolution.

Optionally, the pixel driving circuits 10 included in different sub-pixel groups PiG provide flow paths for corresponding driving currents at different start time points according to the corresponding light emission control signals EM such that the plurality of sub-pixels Pi included in the same sub-pixel group PiG emit light synchronously and the plurality of sub-pixels Pi included in different pixel groups PiG start to emit light at different start time points. In this way, it does not need for the display panel to finish data writing for all sub-pixels and then make all the rows of sub-pixels Pi emit light altogether under the control of a global frequency sweep signal. It facilitates the control of duration of light emission of the sub-pixels Pi of each sub-pixel group PiG such that the display panel can achieve high resolution.

Taking the display panel including two sub-pixel groups PiG for example, the driving framework of the display panel will be described.

Please continue to refer to FIGS. 4A to 4C. The plurality of light emission lines EML include a plurality of first light emission lines EML1 and a plurality of second light emission lines EML2. The plurality of first light emission lines EML1 are configured to transmit first light emission control signals EM1, and the plurality of second light emission lines EML2 are configured to transmit second light emission control signals EM2.

The plurality of frequency sweep lines SWL include a plurality of first frequency sweep lines SWL1 and a plurality of second frequency sweep lines SWL2. The plurality of first frequency sweep lines SWL1 are configured to transmit first frequency sweep signals Sweep1, and the plurality of second frequency sweep lines SWL2 are configured to transmit second frequency sweep signals Sweep2.

The plurality of sub-pixel groups PiG include a first sub-pixel group PiG1 and a second sub-pixel group PiG2.

The pixel driving circuits 10 of the plurality of sub-pixels Pi included in the first sub-pixel group PiG1 are electrically connected to the plurality of first light emission lines EML1. The pulse width modulation modules 102 of the plurality of sub-pixels Pi included in the first sub-pixel group PiG1 are electrically connected to the plurality of first frequency sweep lines SWL1. The plurality of pixel driving circuits 10 included in the first sub-pixel group PiG1 are configured to provide flow paths for corresponding driving currents according to the first light emission control signals EM1. The pulse width modulation modules 102 of the plurality of sub-pixels Pi included in the first sub-pixel group PiG1 are configured to control pulse width of the corresponding driving currents via the pulse amplitude modulation modules 101 of the plurality of sub-pixels Pi included in the first sub-pixel group PiG1 according to corresponding pulse width modulation voltages PWDA and the first frequency sweep signals Sweep1. The first light emission control signals EM1 may include signals EM1_PAM acting on the pulse amplitude modulation modules 101 and signals EM1_PWM acting on the pulse width modulation modules 102. Optionally, EM1_PAM and EM1_PWM can be the same signals or different signals.

The pixel driving circuits 10 of the plurality of sub-pixels Pi included in the second sub-pixel group PiG1 are electrically connected to the plurality of second light emission lines EML2. The pulse width modulation modules 102 of the plurality of sub-pixels Pi included in the first sub-pixel group PiG1 are electrically connected to the plurality of second frequency sweep lines SWL2. The plurality of pixel driving circuits 10 included in the second sub-pixel group PiG2 are configured to provide flow paths for corresponding driving currents according to the second light emission control signals EM2. The pulse width modulation modules 102 of the plurality of sub-pixels Pi included in the second sub-pixel group PiG2 are configured to control pulse width of the corresponding driving currents by cooperating with the pulse amplitude modulation modules 101 of the plurality of sub-pixels Pi included in the second sub-pixel group PiG2 according to corresponding pulse width modulation voltages PWDA and the second frequency sweep signals Sweep2. The second light emission control signals EM2 may include signals EM2_PAM acting on the pulse amplitude modulation modules 101 and signals EM2_PWM acting on the pulse width modulation modules 102. Optionally, EM2_PAM and EM2_PWM can be the same signals or different signals.

By allowing the plurality of sub-pixels Pi included in the first sub-pixel group PiG1 and the plurality of sub-pixels Pi included in the second sub-pixel group PiG2 to use different light emission control signals EM and different frequency sweep signals Sweep, it can achieve the durations of light emission of the sub-pixels Pi included in the first sub-pixel group PiG1 and the second sub-pixel group PiG2 are controlled separately. It is beneficial to reducing the impact of the durations of data writing on the durations of light emission of the sub-pixels Pi and is beneficial to achieving high resolution of the display panel.

Optionally, each of the sub-pixel groups PiG at least includes the plurality of sub-pixels Pi located in the same row. In this way, when the plurality of sub-pixels Pi in the same row are scanned using a progressive scan technique, making the plurality of sub-pixels Pi that are located in the same row and simultaneously enter the data writing stage and the light emission stage belong to the same sub-pixel group PiG can help in reducing control complexity.

Correspondingly, by still taking the display panel including the two sub-pixel groups PiG (i.e., the first sub-pixel group PiG1 and the second sub-pixel group PiG2) for example, it will be described for the case where each of the sub-pixel groups PiG at least includes a plurality of sub-pixels Pi located in the same row. The first sub-pixel group PiG1 at least includes a plurality of sub-pixels Pi located in the same row, and the second sub-pixel group PiG2 at least includes a plurality of the sub-pixels Pi located in the same row. The plurality of sub-pixels Pi included in the first sub-pixel group PiG1 and the plurality of sub-pixels Pi included in the second sub-pixel group PiG2 are located in different rows.

Optionally, each sub-pixel group PiG may include a plurality of rows of sub-pixels Pi such that the plurality of rows of sub-pixels Pi included in the same sub-pixel group PiG are controlled by the same light emission control signal EM and the same frequency sweep signal Sweep to reduce the number of control signals used by the display panel. It is beneficial to reducing the power consumption of control side and reducing the number of driver chips used by the control side. The control side includes a timing controller, a source driver chip, a power driver chip, etc., which are used to control the display panel to achieve the displaying.

Correspondingly, by still taking the display panel including the two sub-pixel groups PiG (i.e., the first sub-pixel group PiG1 and the second sub-pixel group PiG2) for example, it will be described for the case where each of the sub-pixel groups PiG includes a plurality of rows of sub-pixels Pi. The plurality of sub-pixels Pi included in the first sub-pixel group PiG1 are located in different rows, and the plurality of sub-pixels Pi included in the second sub-pixel group PiG2 are located in different rows.

Optionally, each of the sub-pixel groups PiG includes a plurality of consecutive rows of sub-pixels Pi, as shown in FIG. 4A; the plurality of rows of sub-pixels Pi included in the plurality of the sub-pixel groups PiG can be arranged alternately, as shown in FIG. 4B.

FIGS. 5A to 5B are schematic diagrams illustrating a comparison of signal writing methods of the display panel provided in an embodiment of the present application. AA represents a display area. The power supply voltage VDD in FIG. 5B includes a first power supply voltage Vdd_PAM and a second power supply voltage Vdd_PWM.

Optionally, the plurality of sub-pixel groups PiG include a plurality of consecutive rows of sub-pixels Pi. For example, the first sub-pixel group PiG1 includes a plurality of sub-pixels Pi in m1 consecutive rows, and the second sub-pixel group PiG2 includes a plurality of sub-pixels Pi in m2 consecutive rows.

Optionally, the plurality of consecutive rows of sub-pixels Pi included in each sub-pixel group PiG may be located in the same display area such that the plurality of sub-pixels Pi in the same display area can emit light synchronously.

Correspondingly, by still taking the display panel including the two sub-pixel groups PiG (i.e., the first sub-pixel group PiG1 and the second sub-pixel group PiG2) for example, it will be described for the case where each of the sub-pixel groups PiG includes a plurality of consecutive rows of sub-pixels Pi located in the same display area. The display panel includes a first display area AA1 and a second display area AA2 that are adjacent to each other along a second direction D2. The first display area AA1 includes a plurality of consecutive rows of sub-pixels Pi. The second display area AA2 includes a plurality of consecutive rows of sub-pixels Pi. The first sub-pixel group PiG1 includes a plurality of sub-pixels Pi located in the first display area AA1, and the second sub-pixel group PiG2 includes a plurality of sub-pixels Pi located in the second display area AA2.

Optionally, when each of the sub-pixel groups PiG includes a plurality of consecutive rows of sub-pixels Pi, the control signals applied to the plurality of sub-pixel groups PiG may be transmitted to the display panel from different sides of frames of the display panel.

The display panel including the first sub-pixel group PiG1 and the second sub-pixel group PiG2 is still taken for example. Please continue to refer to FIG. 5B. In this application, the driver chip IC located on a lower-frame chip-on-film COF transmits the first sweep signal Sweep1, the first light emission control signal EM1 and the power supply voltage signals VDD and VSS to the display panel; and an upper-frame chip-on-chip film COF transmits the second sweep signal Sweep2, the second light emission control signal EM2 and the power supply voltage signals VDD and VSS to the display panel. Therefore, the upper frame of the display panel is provided with pins that are electrically connected to the chip-on-chip film COF and the display panel such that the second sweep signal Sweep2 and the second light emission control signal EM2 supplied by the driver chip IC can be transmitted to the display panel via corresponding pins.

In the existing design (as shown in FIG. 5A), all rows of sub-pixels Pi in the display panel use a progressive scan technique and realize progressive scanning by the inputted gate control signals Scan_PAM and Scan_PWM. By cooperating with the progressive scanning, the data signals (including PADA and PWDA) realizes data writing to all rows of sub-pixels Pi. The driver chip IC located on the lower-frame chip-on-chip film COF transmits a global frequency sweep signal Sweep, light emission control signal EM and power supply voltage signals VDD and VSS to the display panel; and the chip-on-chip film COF provided on the upper frame transmits the power supply voltage signals VDD and VSS to the display panel.

When the frequency sweep signal Sweep and the light emission control signal EM are transmitted, there will be signal loss on the transmission lines. In this application, the frequency sweep signal Sweep and the light emission control signal EM adopt the design of FIG. 5B. Compared to the design shown in FIG. 5A, this shortens the transmission path of the frequency sweep signal Sweep and the light emission control signal EM, thereby reducing the signal loss on the transmission lines for the frequency sweep signal Sweep and the light emission control signal EM. It is beneficial to improving the display effect of the display panel.

FIGS. 6A to 6E are schematic diagrams illustrating a comparison of display panel combining methods provided in an embodiment of the present application. A side of the display panel equipped with the driver chip IC is a proximal end, and a side away from the proximal end is a distal end. The electrical connection between the driver chip and the display panel can be achieved by the chip-on-chip film COF.

The display panel includes a first sub-pixel group PiG1 and a second sub-pixel group PiG2. The first sub-pixel group PiG1 includes m1 consecutive rows of sub-pixels Pi, and the second sub-pixel group PiG2 includes m2 consecutive rows of sub-pixels Pi. When m1=m2, the first sweep signal Sweep1 and the second sweep signal Sweep2 are transmitted into the display panel from the chip-on-chip films COF provided on opposite sides of frames (e.g., the upper frame and the lower frame as shown in FIG. 5B) of the display panel, respectively (as shown in FIG. 6A). This allows the length of traces provided in the display panel for transmitting the first sweep signal Sweep1 and the second sweep signal Sweep2 to be consistent with each other (i.e., L1=L2) and makes RC (R represents resistance, C represents capacitance) loading consistent as well (as shown in FIG. 6B) such that the display effect of the first sub-pixel group PiG1 and the second sub-pixel group PiG2 is consistent. However, since the upper and lower frames of the display panel are arranged with chip-on-chip films, it can only meet the requirement of combination from the left and right sides of the display panel, as shown in FIG. 6B.

If it needs to realize the design of combination from the upper and lower sides of the display panel, the chip-on-chip films COF disposed on the upper and lower frames need to be moved to the same side of the frame, as shown in FIG. 6C. In order to meet the requirement of combination from the upper and lower sides on the basis of meeting the requirement of combination from the left and right sides, the chip-on-film COFs located on the upper and lower frames of the display panel are moved to the same side of the frame (as shown in FIG. 6D) but this will result in inconsistent length of traces provided in the display panel for transmitting the first sweep signal Sweep1 and the second sweep signal Sweep2 (i.e., L2=2L1), making a large RC loading difference between the first sub-pixel group PiG1 and the second sub-pixel group PiG2. During the displaying, this will cause a serious split-screen phenomenon existing between the first sub-pixel group PiG1 and the second sub-pixel group PiG2.

In order to improve the split-screen problem, the plurality of rows of sub-pixels Pi included in the plurality of sub-pixel groups PiG are arranged alternately.

Optionally, the display panel includes A sub-pixel groups PiG, and a a-th sub-pixel group PiG includes a plurality of sub-pixels Pi located in (a+yA)-th rows such that the plurality of rows of sub-pixels Pi included in the plurality of sub-pixel groups PiG are arranged alternately, where $A>1$, $A\geq a\geq 1$, $y\geq 0$.

Correspondingly, when the display panel only includes the first sub-pixel group PiG1 and the second sub-pixel group PiG2, the plurality of sub-pixels Pi included in the first sub-pixel group PiG1 are located in odd-numbered rows, and the plurality of the sub-pixels Pi included in the second sub-pixel group PiG2 are located in even-numbered rows.

Correspondingly, please continue to refer to FIG. 6E. The chip-on-chip COFs are all disposed on the lower frame (or the upper frame) of the display panel. By making the first sweep signal Sweep1 electrically connect to the odd-numbered rows of the sub-pixels Pi included in the first sub-pixel group PiG1 and making the second sweep signal Sweep2 electrically connect to even-numbered rows of sub-pixels Pi included in the second sub-pixel group PiG2, the length of traces provided in the display panel for transmitting the first frequency sweep signal Sweep1 and the second frequency sweep signal Sweep2 is consistent with each other, thereby ensuring that the RC loading of the sub-pixels Pi in the odd-numbered rows and the sub-pixels Pi in the even-numbered rows is consistent so as to improve the split-screen problem.

Similarly, when the display panel includes three or more than three sub-pixel groups PiG and the plurality of rows of sub-pixels Pi included in the plurality of sub-pixel groups PiG are alternately arranged, the length of trances provided in the display panel for transmitting a of plurality of frequency sweep signals Sweep can also be consistent so as to improve the split-screen problem.

Optionally, the split-screen problem can be improved by cooperation with the design of plurality of sub-pixel groups PiG, in which the number of gate driving units is set as the same as the number of sub-pixel groups PiG.

The display panel including the first sub-pixel group PiG1 and the second sub-pixel group PiG2 is still taken for example. It will be described for the design of gate driving units included in the display panel. FIGS. 7A to 7B are schematic structural diagrams of a gate driving unit provided in an embodiment of the present application, and FIG. 8 is a diagram illustrating corresponding timing of the gate driving unit shown in FIG. 7B.

FIG. 7A shows a design of the gate driving unit when each of sub-pixel groups PiG includes a plurality of consecutive rows of sub-pixels Pi. That is, the display panel includes a gate driving unit, and the gate driving unit includes a plurality of cascaded gate driving circuits GOA. Each of the gate driving circuits GOA is configured to output a gate control signal Scan to a corresponding row of pixel driving circuits 10 via a corresponding scan line. When each of the sub-pixel groups PiG includes a plurality of consecutive rows of sub-pixels Pi, the gate control signals Scan applied to the plurality of sub-pixel groups PiG may still be generated by the same gate driving unit.

Please continue to refer to FIG. 4A and FIG. 7A, the pulse amplitude modulation module 101 of each pixel driving circuit 10 includes a first driving transistor Tdr1, a first data transistor Tda1 and a first reset transistor Ti1. The pulse width modulation module 102 included in each pixel driving circuit 10 includes a second driving transistor Tdr2, a second data transistor Tda2, and a second reset transistor Ti2. Then, the control end of the first data transistor Tda1 of the plurality of sub-pixels Pi located in the x-th row is electrically connected to the output end of the x-th-stage gate driving circuit GOA(x) via a corresponding first scan line SL1, the control end of the second data transistor Tda2 of the plurality of sub-pixels Pi located in the x-th row is electrically connected to the output end of the x-th-stage gate driving circuit GOA(x) via a corresponding third scan line SL3, the control end of the first reset transistor Ti1 of the plurality of sub-pixels Pi located in the x-th row is electrically connected to the output end of the (x−1)-th-stage gate driving circuit GOA(x−1) via a corresponding second scan line SL2, and the control end of the first reset transistor Ti1 of the plurality of sub-pixels Pi located in the x-th row is electrically connected to the output end of the (x−1)-th-stage gate driving circuit GOA(x−1) via a corresponding fourth scan line SL4, where x>0.

If the first sub-pixel group PiG1 includes a plurality of sub-pixels Pi located in the (x−1)-th row to the x-th row, and the second sub-pixel group PiG2 includes a plurality of sub-pixels Pi located in the (x+1)-th row to the (x+2)-th row. Then, the plurality of sub-pixels Pi located in the (x−1)th row to the x-th row receive the first frequency sweep signal Sweep1, and the plurality of sub-pixels Pi located in the (x+1)th row to the (x+2)th row receive the second sweep signal Sweep2. The control end of the first data transistor Tda1 and the control end of the second data transistor Tda2 of the plurality of sub-pixels Pi in the (x−1)th row may be electrically connected to the output end of the (x−1)-th-stage gate driving circuit GOA(x−1), the control end of the first reset transistor Ti1 and the control end of the second reset transistor Ti2 of the plurality of sub-pixels Pi in the (x−1)th row may be electrically connected to the output end of the (x−2)-th-stage gate driving circuit GOA(x−2); the control end of the first data transistor Tda1 and the control end of the second data transistor Tda2 of the plurality of sub-pixels Pi in the (x+1)th row may be electrically connected to the output end of the (x+1)-th-stage gate driving circuit GOA (x+1), the control end of the first reset transistor Ti1 and the control end of the second reset transistor Ti2 of the plurality of sub-pixels Pi in the (x+1)th row may be electrically connected to the output end of the x-th-stage gate driving circuit GOA(x); the control end of the first data transistor Tda1 and the control end of the second data transistor Tda2 of the plurality of sub-pixels Pi in the (x+2)th row may be electrically connected to the output end of the (x+2)-th-stage gate driving circuit GOA(x+2), the control end of the first reset transistor Ti1 and the control end of the second reset transistor Ti2 of the plurality of sub-pixels Pi in the (x+2)th row may be electrically connected to the output end of the (x+1)-th-stage gate driving circuit GOA(x+1).

Please continue to refer to FIG. 4B and FIG. 7B. Taking the display panel including the first sub-pixel group PiG1 and the second sub-pixel group PiG2 for example, it will be described a design for improving the split-screen problem for a gate driving unit cooperating with a plurality of sub-pixel groups PiG.

The display panel includes a first gate driving unit and a second gate driving unit.

Optionally, the first gate driving unit and the second gate driving unit may be located in the same side of frame of the display panel (for example, both the first gate driving unit and the second gate driving unit are located on the left frame, or on the right frame) or may be located on two opposite sides of frame (for example, one of the first gate driving unit and the second gate driving unit is located on the left frame, and the other is located on the right frame).

The first gate driving unit includes a plurality of cascaded first gate driving circuits GOA1, and the plurality of cascaded first gate driving circuits GOAL and the plurality of the sub-pixels Pi included in the first sub-pixel group PiG1 are electrically connected.

The second gate driving unit includes a plurality of cascaded second gate driving circuits GOA2, and the plurality of cascaded second gate driving circuits GOA2 and the plurality of the sub-pixels Pi included in the second sub-pixel group PiG2 are electrically connected.

The plurality of the sub-pixels Pi located in the m-th row included in the first sub-pixel group PiG1 are electrically connected to the m-th-stage first gate driving circuit GOA1 (*m*) via a corresponding first scan line SL1 such that the control end of the first data transistor Tda1 of the plurality of sub-pixels Pi located in the m-th row included in the first sub-pixel group PiG1 is electrically connected to the m-th-stage first gate driving circuit GOA1(*m*).

The plurality of the sub-pixels Pi located in the m-th row included in the first sub-pixel group PiG1 are electrically connected to the (m−1)-th-stage first gate driving circuit GOA1(*m*−1) via a corresponding second scan line SL2 such that the control end of the first reset transistor Ti1 of the plurality of sub-pixels Pi located in the m-th row included in the first sub-pixel group PiG1 is electrically connected to the (m−1)-th-stage first gate driving circuit GOA1(*m*−1).

The plurality of the sub-pixels Pi located in the n-th row included in the second sub-pixel group PiG2 are electrically connected to the n-th-stage second gate driving circuit GOA2(*n*) via the corresponding first scan line SL1 such that the control end of the first data transistor Tda1 of the plurality of sub-pixels Pi located in the n-th row included in the second sub-pixel group PiG2 is electrically connected to the n-th-stage second gate driving circuit GOA2(*n*).

The plurality of the sub-pixels Pi located in the n-th row included in the second sub-pixel group PiG2 are electrically connected to the (n−1)-th-stage second gate driving circuit GOA2(*n*−1) via the corresponding second scan line SL2 such that the control end of the second reset transistor Ti2 of the plurality of sub-pixels Pi located in the n-th row included in the second sub-pixel group PiG2 is electrically connected to the (n−1)-th-stage second gate driving circuit GOA2(*n*−1). m>0, n>0.

Optionally, the control end of the first data transistor Tda1 and the control end of the second data transistor Tda2 included in each pixel driving circuit 10 are electrically connected, and the control end of the first reset transistor Ti1 and the control end of the second reset transistor Ti2 included in each pixel driving circuit 10 are electrically connected such that the number of gate driving units is reduced and the width of the frame of the display panel is reduced.

Correspondingly, the plurality of sub-pixels Pi located in the m-th row included in the first sub-pixel group PiG1 are electrically connected to the m-th-stage first gate driving circuit GOA1(*m*) via a corresponding third scan line SL3 such that the control end of the second data transistor Tda2 of the plurality of sub-pixels Pi located in the m-th row included in the first sub-pixel group PiG1 is electrically connected to the m-th-stage first gate driving circuit GOA1 (*m*).

The plurality of sub-pixels Pi located in the m-th row included in the first sub-pixel group PiG1 are electrically connected to the (m−1)-th-stage first gate driving circuit GOA1(*m*−1) via a corresponding fourth scan line SL4 such that the control end of the second reset transistor Ti2 of the plurality of sub-pixels Pi located in the m-th row included in the first sub-pixel group PiG1 is electrically connected to the (m−)-th-stage first gate driving circuit GOA1(*m*−1).

The plurality of the sub-pixels Pi located in the n-th row included in the second sub-pixel group PiG2 are electrically connected to the n-th-stage second gate driving circuit GOA2(*n*) via the corresponding third scan line SL3 such that the control end of the second data transistor Tda2 of the plurality of sub-pixels Pi located in the n-th row included in the second sub-pixel group PiG2 is electrically connected to the n-th-stage second gate driving circuit GOA2(*n*).

The plurality of the sub-pixels Pi located in the n-th row included in the second sub-pixel group PiG2 are electrically connected to the (n−1)-th-stage second gate driving circuit GOA2(*n*−1) via the corresponding fourth scan line SL4 such that the control end of the second reset transistor Ti2 of the plurality of sub-pixels Pi located in the n-th row included in the second sub-pixel group PiG2 is electrically connected to the (n−1)-th-stage second gate driving circuit GOA2(*n*−1).

FIG. 8 is a timing diagram corresponding to the gate driving unit shown in FIG. 7B, in which U represents voltage, t represents time, and CK and XCK represent clock signals. Optionally, in order to increase the duty cycle of light emission of the light-emitting device Di, the first gate driving unit is configured to receive a first start signal STV1 to generate a plurality of first gate control signals, and the second gate driving unit is configured to receive a second start signal STV2 to generate a plurality of second gate control signals. The effective pulse of the second start signal STV2 lags behind a plurality of effective pulses of the first gate control signal (e.g., before the time tA as shown in FIG. 8, the plurality of effective pulses of the first gate control signal has been output) such that all the sub-pixels Pi included in the first sub-pixel group PiG1 finish the data writing operation, and then the second gate driving unit is controlled to output a plurality of gate control signals to control the plurality of sub-pixels Pi included in the second sub-pixel group PiG2 to finish the data writing operation. In this way, the plurality of sub-pixels Pi included in the first sub-pixel group PiG1 can emit light after the data writing operation is completed, and during the plurality of sub-pixels Pi included in the first sub-pixel group PiG1 emit light, the plurality of sub-pixels Pi included in the second sub-pixel group PiG2 perform the data writing synchronously. When the plurality of sub-pixels Pi included in the second sub-pixel group PiG2 have completed the data writing operation, the plurality of sub-pixels Pi included in the second sub-pixel group PiG2 emit light, and at the same time the plurality of the sub-pixels Pi included in the first sub-pixel group PiG1 perform the data writing operation synchronously. This cycle is repeated, thereby increasing the duty cycle of light emission of the sub-pixel Pi in one frame.

FIGS. 9A to 9B are timing diagrams corresponding to the driving framework of the display panel illustrated in FIG. 4B. Optionally, the light-emission stages corresponding to the sub-pixels Pi of the plurality of sub-pixel groups PiG may partially overlap or may be completely separated.

Optionally, the display panel including the first sub-pixel group PiG1 and the second sub-pixel group PiG2 is still taken for example. It will be described the design of partially overlapping light-emission stages of the sub-pixels Pi of the plurality of sub-pixel groups PiG. Specifically, please continue to refer to FIG. 9A. The plurality of pixel driving circuits 10 included in the first sub-pixel group PiG1 provide flow paths for corresponding driving currents at the first start time ts1 according to the first light emission control signal EM1. The plurality of pixel driving circuits 10 included in the second sub-pixel group PiG2 provide flow paths for corresponding driving currents at the second start time ts2 according to the second light emission control signal EM2. Within a time period corresponding to the first start time ts1 to the second start time ts2, the pixel driving circuits 10 of the plurality of sub-pixels Pi included in the second sub-pixel group PiG2 sequentially receives corresponding pulse amplitude modulation voltages PADA and corresponding pulse width modulation voltages PWDA such that during the plurality of sub-pixels Pi of the first sub-pixel group PiG1 emit light, the plurality of sub-pixels Pi included in the second sub-pixel group PiG2 can perform data writing operations synchronously, thereby advancing the start time of light emission of the first sub-pixel group PiG1. The light emission of the plurality of sub-pixels Pi of the second sub-pixel group PiG2 may end at the end of an initialization stage performed on the plurality of sub-pixels Pi of the first sub-pixel group PiG2. Therefore, the light-emission stage of the plurality of sub-pixels Pi of the second sub-pixel group PiG2 (as shown by t3 (PiG2) in FIG. 9A) may partially overlap with the light-emission stage of the plurality of sub-pixels Pi (as shown by t3 (PiG1) in FIG. 9A) and the initialization stage of the plurality of sub-pixels Pi of the first sub-pixel group PiG1 such that the durations of light emission of the plurality of sub-pixels Pi of the first sub-pixel group PiG1 and the plurality of sub-pixels Pi of the second sub-pixel group PiG2 are improved.

Alternatively, the light emission of the plurality of sub-pixels Pi of the second sub-pixel group PiG2 may end at the start of the initialization stage of the plurality of sub-pixels Pi of the first sub-pixel group PiG2.

That is, the plurality of sub-pixels Pi included in the first sub-pixel group PiG1 perform the data writing (as shown in t2 (PiG1) stage in FIG. 9A), and then during the plurality of sub-pixels Pi included in the first sub-pixel group PiG1 emit light, the plurality of sub-pixels Pi included in the second sub-pixel group PiG2 perform the data writing (as shown in t2 (PiG2) stage in FIG. 9A). After that, the plurality of sub-pixels Pi included in the second sub-pixel group PiG2 and the plurality of sub-pixels Pi included in the first sub-pixel group PiG1 all keep emitting light. After that, the plurality of sub-pixels Pi included in the second sub-pixel group PiG2 keep emitting light, and the plurality of sub-pixels Pi included in the first sub-pixel group PiG1 enter the initialization stage. After that, the plurality of sub-pixels Pi included in the second sub-pixel group PiG2 enter the initialization stage, and the plurality of sub-pixels Pi included in the first sub-pixel group PiG1 enter the data writing stage. After that, the plurality of sub-pixels Pi included in the second sub-pixel group PiG2 enter the data writing stage, and the plurality of sub-pixels Pi included in the first sub-pixel group PiG1 enter the light-emission stage. Following this cycle, the working principle of the display panel is obtained.

Specifically, it is assumed that the first sub-pixel group PiG1 includes a plurality of sub-pixels Pi in the 1st to 325th rows, and the second sub-pixel group PiG2 includes a plurality of sub-pixels Pi in the 326th to 650th rows. Compared to the existing skill using a global frequency sweep signal shared by all rows of sub-pixels (that is, emit light synchronously after 650 rows of data are written, in which the duration of all the light emission is equal to the duration of one frame minus the duration of data writing of 650 rows), the first frequency sweep signal Sweep1 and the second frequency sweep signal Sweep2 divides the 650 rows into two parts and light is emitted separately. That is, after the sub-pixels Pi in the 1st to the 325th rows finish the data writing operation, the first frequency sweep signal Sweep1 and the first light emission control signal EM1 applied to the first sub-pixel group PiG1 control the 1st to 325th rows of sub-pixels Pi to emit light altogether, and this enlargers the duration of light emission of the 1st to 325th rows of sub-pixels Pi in one frame. Similarly, after the sub-pixels Pi in the 326th to the 650th rows finish the data writing operation, the second frequency sweep signal Sweep2 and the second light emission control signal EM2 applied to the second sub-pixel group PiG2 control the 326th to 650th rows of sub-pixels Pi to emit light altogether, and this enlargers the duration of light emission of the 326th to the 650th rows of sub-pixels Pi in one frame. Therefore, the duration of light emission of the 1st to 650th rows of sub-pixels Pi is equal to the duration of one frame minus the duration of data writing of 325 rows. Compared to the existing design using a global frequency sweep signal shared by all rows of sub-pixels Pi, the duration of all rows of sub-pixels Pi in this application increases by 325 more rows of data writing. The duration of one frame may correspond to the difference between the time when the sub-pixel Pi starts to emit light next time and the time when the sub-pixel Pi starts to emit light at this time. For example, for each row, the refresh time can be maintained at 8.333 ms, and the refresh rate of the display panel remains at 120 Hz.

Specifically, the first sub-pixel group PiG1 includes a plurality of sub-pixels Pi in odd-numbered rows, and the second sub-pixel group PiG2 includes a plurality of sub-pixels Pi in even-numbered rows. After the sub-pixels Pi in the odd-numbered rows included in the first sub-pixel group PiG1 finish the data writing operation, the first frequency sweep signal Sweep1 and the first light emission control signal EM1 applied to the first sub-pixel group PiG1 control the sub-pixels Pi in the odd-numbered rows to emit light altogether, and this enlargers the duration of light emission of the sub-pixels Pi in the odd-numbered rows in one frame. Similarly, after the sub-pixels Pi in the even-numbered rows finish the data writing operation, the second frequency sweep signal Sweep2 and the second light emission control signal EM2 applied to the second sub-pixel group PiG2 control the sub-pixels Pi in the even-numbered rows to emit light altogether, and this enlargers the duration of light emission of the sub-pixels Pi in the even-numbered rows in one frame.

It can be understood that this application only describes an embodiment in which the light-emission stages corresponding to the first sub-pixel group PiG1 and the second sub-pixel group PiG2 partially overlap. For the number of sub-pixel groups PiG included in the display panel greater than 2, the working principle of partial overlapping of the light-emission stages of the plurality of sub-pixel groups PiG can be obtained by referring to the working principle of partial overlapping of the light-emission stages of the first sub-pixel group PiG1 and the second sub-pixel group PiG2.

Although simultaneous light emission of the plurality of sub-pixels Pi can effectively increase the proportion of duration of light emission, it will cause high power consumption. Therefore, in order to reduce instant total current, reduce the voltage drop and improve brightness uniformity for the display panel, the light-emission stages of the plurality of sub-pixel groups PiG can be completely separated.

Please continue to refer to FIG. 9B. The display panel including the first sub-pixel group PiG1 and the second sub-pixel group PiG2 is still taken for example. It will be described the design of non-overlapping light-emission stages of the sub-pixels Pi of the plurality of sub-pixel groups PiG.

The plurality of pixel driving circuits 10 included in the first sub-pixel group PiG1 generate corresponding driving currents at the first start time ts1 according to the first light emission control signal EM1. The plurality of pixel driving circuits 10 included in the second sub-pixel group PiG2 generate corresponding driving currents at the second start time ts2 according to the second light emission control signal EM2. The plurality of pixel driving circuits 10 included in the first sub-pixel group PiG1 stop generating the corresponding driving currents according to the second light emission control signal EM2 at the second start time ts2.

That is, the plurality of sub-pixels Pi included in the first sub-pixel group PiG1 perform the data writing (as shown in t2 (PiG1) stage in FIG. 9B), and then during the plurality of sub-pixels Pi included in the first sub-pixel group PiG1 emit light, the plurality of sub-pixels Pi included in the second sub-pixel group PiG2 perform the data writing (as shown in t2 (PiG2) stage in FIG. 9B). After that, when the plurality of sub-pixels Pi included in the first sub-pixel group PiG1 end the light emission and then enter an initialization stage, the plurality of sub-pixels Pi included in the second sub-pixel group PiG2 starts to emit light. After that, the plurality of sub-pixels Pi included in the second sub-pixel group PiG2 emits light (as shown in t3 (PiG2) stage in FIG. 9B), and the plurality of sub-pixels Pi included in the first sub-pixel group PiG1 perform the initialization and the data writing. After that, when the plurality of sub-pixels Pi included in the second sub-pixel group PiG2 end the light emission and enter the initialization stage, the plurality of sub-pixels Pi included in the first sub-pixel group PiG1 starts to emit light. Following this cycle, the working principle of the display panel is obtained.

Specifically, it is assumed that the first sub-pixel group PiG1 includes a plurality of sub-pixels Pi in the 1st to 325th rows, and the second sub-pixel group PiG2 includes a plurality of sub-pixels Pi in the 326th to 650th rows. After the sub-pixels Pi in the 1st to 325th rows complete the data writing operation, the first frequency sweep signal Sweep1 and the first light emission control signal EM1 applied to the first sub-pixel group PiG1 control the 1st to 325th rows of sub-pixels Pi to emit light altogether. When the light emission of the plurality of sub-pixels Pi in the 1st to 325th rows ends, the sub-pixels Pi in the 326th to 650th rows starts to emit light. Therefore, the sub-pixels Pi included in the first sub-pixel group PiG1 and the sub-pixels Pi included in the second sub-pixel group PiG2 do not emit light at the same time. This can reduce the instant total current, reduce the voltage drop and improve brightness uniformity for the display panel.

Specifically, the first sub-pixel group PiG1 includes a plurality of sub-pixels Pi in odd-numbered rows, and the second sub-pixel group PiG2 includes a plurality of sub-pixels Pi in even-numbered rows. When the light emission of the plurality of sub-pixels Pi in the odd-numbered rows included in the first sub-pixel group PiG1 ends, the sub-pixels Pi in the even-numbered rows included in the second sub-pixel group PiG2 starts to emit light such that the instant total current is reduced, the voltage drop is reduced and brightness uniformity is improved for the display panel.

It can be understood that this application only describes an embodiment in which the light-emission stages corresponding to the first sub-pixel group PiG1 and the second sub-pixel group PiG2 are not overlapped. For the number of sub-pixel groups PiG included in the display panel greater than 2, the working principle of non-overlapping of the light-emission stages of the plurality of sub-pixel groups PiG can be obtained by referring to the working principle of non-overlapping of the light-emission stages of the first sub-pixel group PiG1 and the second sub-pixel group PiG2.

Optionally, before writing data to the plurality of sub-pixel groups PiG, one initialization operation can be performed for them (e.g., stage t1 in FIGS. 9A and 9B) such that the voltage levels of a first node N1 and a fourth node N4 in the pixel driving circuit 10 are initialized, making the display panel have a better display foundation.

FIG. 10 is a schematic structural diagram illustrating a pixel driving circuit 10 provided in an embodiment of the present application. The pixel driving circuit 10 shown in FIG. 10 is only used to illustrate the structure of a pixel driving circuit 10 that can be applied in this application and is not used to limit this application to the structure of the pixel driving circuit 10.

Please continue to refer to FIG. 10. The pulse amplitude modulation module 101 includes a first driving module, a first data writing module, a first compensation module, a first reset module and a first switch module.

The first driving module is configured to generate a driving current according to the pulse amplitude modulation voltage PADA for driving the light emitting device Di to emit light.

Optionally, the first driving module includes a first driving transistor Tdr1 and a first capacitor C1.

The control end of the first driving transistor Tdr1 is electrically connected to a first node N1, the input end of the first driving transistor Tdr1 is electrically connected to a second node N2, and the output end of the first driving transistor Tdr1 is electrically connected to a third node N3.

The first capacitor C1 has a first end electrically connected to the first node N1 and a second end electrically connected to a second power supply end Vdd_PWM.

The first data writing module is configured to transmit the pulse amplitude modulation voltage PADA to the second node N2 according to a corresponding gate control signal.

Optionally, the first data writing module includes a first data transistor Tda1. The control end of the first data transistor Tda1 is electrically connected to the first scan line SL1. The input end of the first data transistor Tda1 is configured to receive the pulse amplitude modulation voltage PADA. The output end of the first data transistor Tda1 is electrically connected to the second node N2.

The first compensation module is configured to electrically connect the first node N1 and the third node N3 according to corresponding gate control signal.

Optionally, the first compensation module includes a first compensation transistor Tc1. The control end of the first compensation transistor Tel is electrically connected to the first scan line SL1, the input end of the first compensation transistor Tc1 is electrically connected to the third node N3, and the output end of the first compensation transistor Tc1 is electrically connected to the first node N1.

The first switch module is configured to electrically connect the first driving transistor Tdr1, the first power supply end Vdd_PAM and the light-emitting device Di according to a corresponding light emission control signal EM.

Optionally, the first switch module includes a first switch transistor Ts1 and a second switch transistor Ts2. The control end of the first switch transistor Ts1 is electrically connected to a corresponding light emission line EML. The input end of the first switch transistor Ts1 is electrically connected to the first power supply end Vdd_PAM. The control end of the first switch transistor Ts1 is electrically connected to the second node N2. The control end of the second switch transistor Ts2 is electrically connected to the control end of the first switch transistor Ts1, the input end of the second switch transistor Ts2 is electrically connected to the third node N3, and the output end of the second switch transistor Ts2 is electrically connected to a corresponding light-emitting device Di.

The first reset module is configured to electrically connect the first node N1 and a first reset line VL1 according to a corresponding gate control signal, so as to transmit a first reset voltage transmitted by the first reset line VL1 to the first node to initialize the voltage level of the first node N1.

Optionally, the first reset module includes a first reset transistor Ti1. The control end of the first reset transistor Ti1 is electrically connected to the second scan line SL2, the input end of the first reset transistor Ti1 is electrically connected to the first reset line VL1, and the output end of the first reset transistor Ti1 is electrically connected to the first node N1.

Please continue to refer to FIG. 10. The pulse width modulation module 102 includes a second driving module, a second data writing module, a second compensation module, a second reset module and a second switch module.

The second driving module is configured to control the first driving transistor Tdr1 to turn on or off according to a pulse width modulation voltage PWDA and a corresponding frequency sweep signal Sweep.

Optionally, the second driving module includes a second driving transistor Tdr2 and a second capacitor C2.

The control end of the second driving transistor Tdr2 is electrically connected to a fourth node N4, the input end of the second driving transistor Tdr2 is electrically connected to a fifth node N5, and the output end of the second driving transistor Tdr2 is electrically connected to a sixth node N6.

The second capacitor C2 has a first end electrically connected to a corresponding frequency sweep line SWL and a second end electrically connected to the fourth node N4.

The second data writing module is configured to transmit the pulse width modulation voltage PWDA to the input end of the second driving transistor Tdr2 according to a corresponding gate control signal.

Optionally, the second data writing module includes a second data transistor Tda2. The control end of the second data transistor Tda2 is electrically connected to the third scan line SL3. The input end of the second data transistor Tda2 is configured to receive the pulse width modulation voltage PWDA. The output end of the second data transistor Tda2 is electrically connected to the fifth node N5.

The second compensation module is configured to electrically connect the control end of the second driving transistor Tdr2 and the output end of the second driving transistor Tdr2 according to a corresponding gate control signal.

The second compensation module includes a second compensation transistor Tc2. The control end of the second compensation transistor Tc2 is electrically connected to the third scan line SL3. The input end of the second compensation transistor Tc2 is electrically connected to the sixth node N6. The output end of the second compensation transistor Tc2 is electrically connected to the fourth node N4.

The second switch module is configured to electrically connect the second driving transistor Tdr2, a second power supply end Vdd_PWM and the first driving transistor Tdr1 according to a corresponding light emission control signal EM.

Optionally, the second switch module includes a third switch transistor Ts3 and a fourth switch transistor Ts4. The control end of the third switch transistor Ts3 is electrically connected to the control end of the first switch transistor Ts1, and the input end of the third switch transistor Ts3 is electrically connected to the second power supply end Vdd_PWM. The output end of the third switch transistor Ts3 is electrically connected to the fifth node N5. The control end of the fourth switch transistor Ts4 is electrically connected to the control end of the third switch transistor Ts3, the input end of the fourth switch transistor Ts4 is electrically connected to the sixth node N6, and the output end of the fourth switch transistor Ts4 is electrically connected to the first node N1.

The second reset module is configured to electrically connect the fourth node N4 and the first reset line VL1 according to a corresponding gate control signal, so as to transmit a first reset voltage transmitted by the first reset line VL1 to the fourth node N4 to initialize the voltage level of the fourth node N4.

The second reset module includes a second reset transistor Ti2. The control end of the second reset transistor Ti2 is electrically connected to a fourth scan line SL4, and the input end of the second reset transistor Ti2 is electrically connected to the first reset line VL1, and the output end of the second reset transistor Ti2 is electrically connected to the fourth node N4.

Optionally, the pulse amplitude modulation module 101 further includes a third reset module configured to transmit a second reset signal transmitted by a second reset line VL2 to the anode of a corresponding light-emitting device Di according to a discharging control signal Disc transmitted by a discharging scan line Disc L to initialize the voltage level of the anode of the light-emitting device Di.

Optionally, the third reset module includes a third reset transistor Ti3. The control end of the third reset transistor Ti3 is electrically connected to the discharging scan line DisL, the input end of the third reset transistor Ti3 is electrically connected to the second reset line VL2, and the output end of the third reset transistor Ti3 is electrically connected to the corresponding light-emitting device Di.

Optionally, in order for the light-emitting device Di to emit light successfully, the voltage supplied by the first power supply end Vdd_PAM>the voltage supplied by the second power supply end Vdd_PWM>the voltage corresponding to the first reset signal>the voltage corresponding to the second reset signal.

Optionally, the cathode of the light-emitting device Di is electrically connected to a third power supply end VSS.

Alternatively, in some embodiments, the pixel driving circuit 10 may not include the first compensation transistor Tc1 and the second compensation transistor Tc2 for compensating the threshold voltage of the driving transistor.

Optionally, each transistor included in the pixel driving circuit 10 may be a N-type or P-type transistor, and the type of transistors may be LTPS, a-Si, IGZO, etc.

Optionally, the light-emitting devices Di are arranged in the display panel with quantities in pixel level.

FIG. 11 is a diagram illustrating the timing corresponding to the pixel driving circuit 10 shown in FIG. 10. The sub-pixels Pi located in the nth row are taken for example. Various transistors included in the pixel driving circuit 10 are P-type transistors. The gate control signal outputted by n-th-stage gate driving circuit that is received by the control end of the first data transistor Tda1 via the first scan line SL1 is Scan_PAM(n). The gate control signal outputted by (n−1)-th-stage gate driving circuit that is received by the control end of the first reset transistor Ti1 via the second scan line SL2 is Scan_PAM(n−1). The gate control signal outputted by n-th-stage gate driving circuit that is received by the control end of the second data transistor Tda2 via the third scan line SL3 is Scan_PWM(n). The gate control signal outputted by (n−1)-th-stage gate driving circuit that is received by the control end of the second reset transistor Ti2 via the fourth scan line SL4 is Scan_PWM(n−1). The light emission control signal EM received by the control end of the first switch transistor Ts1 and the control end of the second switch transistor Ts2 via a corresponding light emission line EML is EM_PAM(n). The light emission control signal EM received by the control end of the third switch transistor Ts3 and the control end of the fourth switch transistor Ts4 via a corresponding light emission line EML is EM_PWM(n). It will be described the working principle of the pixel driving circuit 10 shown in FIG. 10.

Initialization stage t1: the gate control signal Scan_PAM (n) received by the control end of the first data transistor Tda1 is high level, and the gate control signal Scan_PWM (n) received by the control end of the second data transistor Tda2 is high level; the gate control signal Scan_PAM(n−1) received by the control end of the first reset transistor Ti1 is low level, and the gate control signal Scan_PWM(n−1) received by the control end of the second reset transistor Ti2 is low level; the light emission control signal EM_PAM(n) received by the control end of the first switch transistor Ts1 and the control end of the second switch transistor Ts2 is high level, and the light emission control signal EM_PWM (n) received by the control end of the third switch transistor Ts3 and the control end of the fourth switch transistor Ts4 is high level.

The first reset transistor Ti1 and the second reset transistor Ti2 are turned on, the first reset voltage transmitted by the first reset line VL1 is transmitted to the first node N1 via the first reset transistor Ti1, and the first reset voltage is transmitted to the fourth node N4 via the second reset transistor Ti2 to initialize the voltage levels of the first node N1 and the fourth node N4.

Data writing stage t2: the gate control signal Scan_PAM (n) received by the control end of the first data transistor Tda1 is low level, and the gate control signal Scan_PWM(n) received by the control end of the second data transistor Tda2 is low level; the gate control signal Scan_PAM(n−1) received by the control end of the first reset transistor Ti1 is high level, and the gate control signal Scan_PWM(n−1) received by the control end of the second reset transistor Ti2 is high level; the light emission control signal EM_PAM(n) received by the control end of the first switch transistor Ts1 and the control end of the second switch transistor Ts2 is high level, and the light emission control signal EM_PWM (n) received by the control end of the third switch transistor Ts3 and the control end of the fourth switch transistor Ts4 is high level.

The first data transistor Tda1, the second data transistor Tda2, the first compensation transistor Tc1 and the second compensation transistor Tc2 are turned on, the first driving transistor Tdr1 and the second driving transistor Tdr2 are turned on, the pulse amplitude modulation voltage PADA is applied to the first driving transistor Tdr1 for threshold voltage compensation, and the pulse width modulation voltage PWDA is applied to the second driving transistor Tdr2 for threshold voltage compensation.

Optionally, the discharging control signal Disc transmitted by the discharging scan line DisL has a low-level state in at least one of the initialization stage and the data writing stage such that the third reset transistor Ti3 is turned on, and the second reset signal transmitted by the second reset line VL2 is transmitted to the anode of a corresponding light-emitting device Di to initialize the voltage level of the anode of the light-emitting device Di.

Light-emission stage t3: the gate control signal Scan_PAM(n) received by the control end of the first data transistor Tda1 is high level, and the gate control signal Scan_PWM(n) received by the control end of the second data transistor Tda2 is high level; the gate control signal Scan_PAM(n−1) received by the control end of the first reset transistor Ti1 is high level, and the gate control signal Scan_PWM(n−1) received by the control end of the second reset transistor Ti2 is high level, and the discharging control signal Disc is high level; the light emission control signal EM_PAM(n) received by the control end of the first switch transistor Ts1 and the control end of the second switch transistor Ts2 is low level, and the light emission control signal EM_PWM(n) received by the control end of the third switch transistor Ts3 and the control end of the fourth switch transistor Ts4 is low level.

The first switch transistor Ts1 to the fourth switch transistor Ts4 are turned on, and the driving current flows through the light-emitting device Di such that the light-emitting device Di starts to emit light. The third switch transistor Ts3 and the fourth switch transistor Ts4 are turned on, the gate-source voltage difference of the second driving transistor Tdr2 is greater than or equal to the threshold voltage of the second driving transistor Tdr2 (i.e., Vgs_Tdr2≥Vth_Tdr2), and the second driving transistor Tdr2 remains in the turned-off state. The voltage of the frequency sweep signal Sweep received by the pixel driving circuit 10 starts to decrease and is coupled with the voltage level of the fourth node N4 via the second capacitor C2. When the gate-source voltage difference of the second driving transistor Tdr2 is less than the threshold voltage of the second driving transistor Tdr2 (Vgs_Tdr2<Vth_Tdr2), the second driving transistor Tdr2 is turned on, and the high voltage supplied by the second power supply end Vdd_PWM is transmitted to the first node N1 via the third switch transistor Ts3, the second driving transistor Tdr2 and the fourth switch transistor Ts4 such that the gate-source voltage difference of the first driving transistor Tdr1 is greater than or equal to the threshold voltage of the first driving transistor Tdr1 (i.e., Vgs_Tdr1≥Vth_Tdr1), the first driving transistor Tdr1 is turned off, and the light-emitting device Di stops emitting light.

By setting different pulse width modulation voltages PWDA, it can be realized the switching of different durations of light emission. That is, given different pulse width modulation voltages PWDA, the durations of on state of the second driving transistor Tdr2 controlled by corresponding frequency sweep signals Sweep are different. Correspondingly, the durations the pulse amplitude modulation module 101 works are different such that the durations of light emission can be adjusted.

Optionally, when the display panel operates for high gray scales, the display brightness is mainly determined by the driving current, that is, it is only controlled by the pulse amplitude modulation module 101 (the current flowing through the light-emitting device Di can be changed by writing different pulse amplitude modulation voltages PADA). When the display panel operates for high gray scales, in order to ensure that the durations of light emission remain unchanged, the pulse width modulation module 102 can write a constant high pulse width modulation voltage such that the second driving transistor Tdr2 cannot be turned on and cannot act on the pulse amplitude modulation module 101.

Optionally, when the display panel operates for low gray scales, in order to ensure the stability of light-emission efficiency of the light-emitting device Di, the duration of light emission needs to be adjusted to change the brightness while the current remains unchanged, that is, the pulse amplitude modulation module 101 is used to ensure that the driving current does not change. The pulse width modulation module 102 is used to act on the pulse amplitude modulation module 101 to control the pulse amplitude modulation module 101 to turn off in advance, thereby changing the duration of light emission of the light-emitting device Di.

The present application further provides a display device including any of the afore-described display panel. Optionally, the display device includes a mobile phone, a computer, a band, etc.

The person of ordinary skill in the art can make variations and modifications to the present application in terms of the specific implementations and application scopes according to the ideas of the present application. Therefore, the content of specification shall not be construed as a limit to the present application.

The invention claimed is:

1. A display panel, comprising:

a plurality of light emission lines, configured to transmit a plurality of light emission control signals;

a plurality of frequency sweep lines, configured to transmit a plurality of frequency sweep signals; and a plurality of sub-pixel groups, each of the sub-pixel groups comprises a plurality of sub-pixels, each of the sub-pixels comprises a light-emitting device and a pixel driving circuit; the pixel driving circuit is configured to provide a flow path according to a corresponding light emission control signal for a driving current driving the light-emitting device to emit light, the pixel driving circuit comprises a pulse amplitude modulation module and a pulse width modulation module, the pulse amplitude modulation module is configured to receive a corresponding pulse amplitude modulation voltage to control a pulse amplitude of the driving current; the pulse width modulation module is configured to control a pulse width of the driving current by cooperating with the pulse amplitude modulation module according to a corresponding frequency sweep signal and pulse width modulation voltage when the pixel driving circuit provides the flow path for the driving current according to the corresponding light emission control signal, wherein the pulse width modulation modules of the plurality of sub-pixels comprised in the same sub-pixel group are used to receive the same frequency sweep signal, and the pulse width modulation modules and the pulse amplitude modulation modules of the plurality of sub-pixels comprised in the same sub-pixel group are used to receive the same light emission control signal; the start time when the pixel driving circuits of at least two of the sub-pixel groups provide the flow paths for corresponding driving currents according to the corresponding light emission control signals is different;

wherein the plurality of light emission lines comprise a plurality of first light emission lines and a plurality of second light emission lines, the plurality of first light emission lines are configured to transmit first light emission control signals, and the plurality of second light emission lines are configured to transmit second light emission control signals;

wherein the plurality of frequency sweep lines comprise a plurality of first frequency sweep lines and a plurality of second frequency sweep lines, the plurality of first frequency sweep lines are configured to transmit first frequency sweep signals, and the plurality of second frequency sweep lines are configured to transmit second frequency sweep signals;

wherein the plurality of sub-pixel groups comprises a first sub-pixel group and a second sub-pixel group, the pixel driving circuits of the plurality of sub-pixels comprised in the first sub-pixel group are electrically connected to the plurality of first light emission lines, the pulse width modulation modules of the plurality of sub-pixels comprised in the first sub-pixel group are electrically connected to the plurality of first frequency sweep lines; the pixel driving circuits of the plurality of sub-pixels comprised in the second sub-pixel group are electrically connected to the plurality of second light emission lines, and the pulse width modulation modules of the plurality of sub-pixels comprised in the second sub-pixel group are electrically connected to the plurality of second frequency sweep lines;

wherein the plurality of pixel driving circuits comprised in the first sub-pixel group are configured to provide flow paths for corresponding driving currents according to the first light emission control signals, the pulse width modulation modules of the plurality of sub-pixels comprised in the first sub-pixel group are configured to control the pulse width of the corresponding driving currents via the pulse amplitude modulation modules of the plurality of sub-pixels comprised in the first sub-pixel group according to corresponding pulse width modulation voltages and the first frequency sweep signals, wherein the plurality of pixel driving circuits comprised in the second sub-pixel group are configured to provide flow paths for corresponding driving currents according to the second light emission control signals, the pulse width modulation modules of the plurality of sub-pixels comprised in the second sub-pixel group are configured to control the pulse width of the corresponding driving currents via the pulse amplitude modulation modules of the plurality of sub-pixels comprised in the second sub-pixel group according to corresponding pulse width modulation voltages and the second frequency sweep signals;

wherein the first sub-pixel group at least comprises the plurality of sub-pixels located in the same row, and the second sub-pixel group at least comprises the plurality of the sub-pixels located in the same row, wherein the plurality of sub-pixels comprised in the first sub-pixel group and the plurality of sub-pixels comprised in the second sub-pixel group are located in different rows;

wherein the plurality of sub-pixels comprised in the first sub-pixel group are located in different rows, and the plurality of sub-pixels comprised in the second sub-pixel group are located in different rows;

wherein the plurality of sub-pixels comprised in the first sub-pixel group are located in odd-numbered rows, and the plurality of sub-pixels comprised in the second sub-pixel group are located in even-numbered rows;

wherein the pulse amplitude modulation module comprises:

a first driving transistor, wherein a control end of the first driving transistor is electrically connected to a first node, an input end of the first driving transistor is electrically connected to a second node, and an output end of the first driving transistor is electrically connected to a third node;

a first data transistor, wherein the control end of the first data transistor is electrically connected to a first scan line, the input end of the first data transistor is configured to receive the pulse amplitude modulation voltage, and the output end of the first data transistor is electrically connected to the second node;

a first compensation transistor, wherein the control end of the first compensation transistor is electrically connected to the first scan line, the input end of the first compensation transistor is electrically connected to the third node, and the output end of the first compensation transistor is electrically connected to the first node;

a first switch transistor, wherein the control end of the first switch transistor is electrically connected to a corresponding light emission line, the input end of the first switch transistor is electrically connected to a first power supply end, and the output end of the first switch transistor is electrically connected to the second node;

a second switch transistor, wherein the control end of the second switch transistor is electrically connected to the control end of the first switch transistor, the input end of the second switch transistor is electrically connected to the third node, and the output end of the second switch transistor is electrically connected to a corresponding light-emitting device;

a first reset transistor, wherein the control end of the first reset transistor is electrically connected to a second scan line, the input end of the first reset transistor is electrically connected to a first reset line, and the output end of the first reset transistor is electrically connected to the first node; and a first capacitor, wherein a first end of the first capacitor is electrically connected to the first node, and a second end of the first capacitor is electrically connected to a second power supply end;

wherein the pulse width modulation module comprises:

a second driving transistor, wherein the control end of the second driving transistor is electrically connected to a fourth node, the input end of the second driving transistor is electrically connected to a fifth node, and the output end of the second driving transistor is electrically connected to a sixth node;

a second data transistor, wherein the control end of the second data transistor is electrically connected to a third scan line, the input end of the second data transistor is configured to receive the pulse width modulation voltage, and the output end of the second data transistor is electrically connected to the fifth node;

a second compensation transistor, wherein the control end of the second compensation transistor is electrically connected to the third scan line, the input end of the second compensation transistor is electrically connected to the sixth node, and the output end of the second compensation transistor is electrically connected to the fourth node;

a third switch transistor, wherein the control end of the third switch transistor is electrically connected to the control end of the first switch transistor, the input end of the third switch transistor is electrically connected to the second power supply end, and the output end of the third switch transistor is electrically connected to the fifth node N5;

a fourth switch transistor, wherein the control end of the fourth switch transistor is electrically connected to the control end of the third switch transistor, the input end of the fourth switch transistor is electrically connected to the sixth node, and the output end of the fourth switch transistor is electrically connected to the first node;

a second reset transistor, wherein the control end of the second reset transistor is electrically connected to a fourth scan line, the input end of the second reset transistor is electrically connected to the first reset line, and the output end of the second reset transistor is electrically connected to the fourth node; and a second capacitor, wherein the first end of the second capacitor is electrically connected to a corresponding frequency sweep line, and the second end of the second capacitor is electrically connected to the fourth node;

wherein display panel further comprises: a first gate driving unit, comprising a plurality of cascaded first gate driving circuits, the plurality of cascaded first gate driving circuits are electrically connected to the plurality of sub-pixels comprised in the first sub-pixel group; and a second gate driving unit, comprising a plurality of cascaded second gate driving circuits, the plurality of cascaded second gate driving circuits are electrically connected to the plurality of the sub-pixels comprised in the second sub-pixel group, wherein the plurality of sub-pixels located in a m-th row comprised in the first sub-pixel group are electrically connected to a m-th-stage first gate driving circuit via a corresponding first scan line, and the plurality of sub-pixels located in the m-th row comprised in the first sub-pixel group are electrically connected to a (m−1)-th-stage first gate driving circuit via a corresponding second scan line, wherein the plurality of sub-pixels located in a n-th row comprised in the second sub-pixel group are electrically connected to a n-th-stage second gate driving circuit via the corresponding first scan line, and the plurality of sub-pixels located in the (n−1)-th row comprised in the second sub-pixel group are electrically connected to a (n−1)-th-stage second gate driving circuit via the corresponding second scan line, where $m>0$ and $n>0$;

wherein the plurality of sub-pixels located in the m-th row comprised in the first sub-pixel group are electrically connected to the m-th-stage first gate driving circuit via a corresponding third scan line, and the plurality of sub-pixels located in the m-th row comprised in the first sub-pixel group are electrically connected to the (m−1)-th-stage first gate driving circuit via a corresponding fourth scan line; and the plurality of sub-pixels located in the n-th row comprised in the second sub-pixel group are electrically connected to the n-th-stage second gate driving circuit via the corresponding third scan line, and the plurality of sub-pixels located in the n-th row comprised in the second sub-pixel group are electrically connected to the (n−1)-th-stage second gate driving circuit via the corresponding fourth scan line.

2. The display panel according to claim 1, wherein each of the light emission lines extends along a first direction, and the plurality of light emission lines are arranged along a second direction; the display panel comprises a first display area and a second display area that are adjacent to each other along the second direction, the first display area comprises a plurality of consecutive rows of sub-pixels, and the second display area comprises a plurality of consecutive rows of sub-pixels, wherein the first sub-pixel group comprises the plurality of sub-pixels located in the first display area, and the second sub-pixel group comprises the plurality of sub-pixels located in the second display area.

3. The display panel according to claim 1, wherein the plurality of pixel driving circuits comprised in the first sub-pixel group provide flow paths for corresponding driving currents at a first start time according to the first light emission control signals; the plurality of pixel driving circuits comprised in the second sub-pixel group provide flow paths for corresponding driving currents at a second start time according to the second light emission control signals, wherein within a time period corresponding to the first start time to the second start time, the pixel driving circuits of the plurality of sub-pixels comprised in the second sub-pixel group sequentially receive corresponding pulse amplitude modulation voltages and corresponding pulse width modulation voltages.

4. The display panel according to claim 1, wherein the plurality of pixel driving circuits comprised in the first sub-pixel group generate corresponding driving currents at a first start time according to the first light emission control signals; the plurality of pixel driving circuits comprised in the second sub-pixel group generate corresponding driving currents at a second start time according to the second light emission control signals, wherein the plurality of pixel driving circuits comprised in the first sub-pixel group stop generating the corresponding driving currents according to the second light emission control signals at the second start time.

5. The display panel according to claim 1, wherein the first gate driving unit is configured to receive a first start signal to generate a plurality of first scan signals, and the second gate driving unit is configured to receive a second start signal to generate a plurality of second scan signals, wherein an effective pulse of the second start signal lags behind a plurality of effective pulses of the first scan signals.

6. The display panel according to claim 1, wherein the pulse amplitude modulation module comprises:

a third reset transistor, the control end of the third reset transistor is electrically connected to a discharging scan line, the input end of the third reset transistor is electrically connected to a second reset line, and the output end of the third reset transistor is electrically connected to a corresponding light-emitting device.

7. A display device, comprising a display panel, which comprises:

a plurality of light emission lines, configured to transmit a plurality of light emission control signals;

a plurality of frequency sweep lines, configured to transmit a plurality of frequency sweep signals; and a plurality of sub-pixel groups, each of the sub-pixel groups comprises a plurality of sub-pixels, each of the sub-pixels comprises a light-emitting device and a pixel driving circuit; the pixel driving circuit is configured to provide a flow path according to a corresponding light emission control signal for a driving current driving the light-emitting device to emit light, the pixel driving circuit comprises a pulse amplitude modulation module and a pulse width modulation module, the pulse amplitude modulation module is configured to receive a corresponding pulse amplitude modulation voltage to control a pulse amplitude of the driving current; the pulse width modulation module is configured to control a pulse width of the driving current by cooperating with the pulse amplitude modulation module according to a corresponding frequency sweep signal and pulse width modulation voltage when the pixel driving circuit provides the flow path for the driving current according to the corresponding light emission control signal, wherein the pulse width modulation modules of the plurality of sub-pixels comprised in the same sub-pixel group are used to receive the same frequency sweep signal, and the pulse width modulation modules and the pulse amplitude modulation modules of the plurality of sub-pixels comprised in the same sub-pixel group are used to receive the same light emission control signal; the start time when the pixel driving circuits of at least two of the sub-pixel groups provide the flow paths for corresponding driving currents according to the corresponding light emission control signals is different;

wherein the plurality of light emission lines comprise a plurality of first light emission lines and a plurality of second light emission lines, the plurality of first light emission lines are configured to transmit first light emission control signals, and the plurality of second light emission lines are configured to transmit second light emission control signals;

wherein the plurality of frequency sweep lines comprise a plurality of first frequency sweep lines and a plurality of second frequency sweep lines, the plurality of first frequency sweep lines are configured to transmit first frequency sweep signals, and the plurality of second frequency sweep lines are configured to transmit second frequency sweep signals;

wherein the plurality of sub-pixel groups comprises a first sub-pixel group and a second sub-pixel group, the pixel driving circuits of the plurality of sub-pixels comprised in the first sub-pixel group are electrically connected to the plurality of first light emission lines, the pulse width modulation modules of the plurality of sub-pixels comprised in the first sub-pixel group are electrically connected to the plurality of first frequency sweep lines; the pixel driving circuits of the plurality of sub-pixels comprised in the second sub-pixel group are electrically connected to the plurality of second light emission lines, and the pulse width modulation modules of the plurality of sub-pixels comprised in the second sub-pixel group are electrically connected to the plurality of second frequency sweep lines;

wherein the plurality of pixel driving circuits comprised in the first sub-pixel group are configured to provide flow paths for corresponding driving currents according to the first light emission control signals, the pulse width modulation modules of the plurality of sub-pixels comprised in the first sub-pixel group are configured to control the pulse width of the corresponding driving currents via the pulse amplitude modulation modules of the plurality of sub-pixels comprised in the first sub-pixel group according to corresponding pulse width modulation voltages and the first frequency sweep signals, wherein the plurality of pixel driving circuits comprised in the second sub-pixel group are configured to provide flow paths for corresponding driving currents according to the second light emission control signals, the pulse width modulation modules of the plurality of sub-pixels comprised in the second sub-pixel group are configured to control the pulse width of the corresponding driving currents via the pulse amplitude modulation modules of the plurality of sub-pixels comprised in the second sub-pixel group according to corresponding pulse width modulation voltages and the second frequency sweep signals;

wherein the first sub-pixel group at least comprises the plurality of sub-pixels located in the same row, and the second sub-pixel group at least comprises the plurality of the sub-pixels located in the same row, wherein the plurality of sub-pixels comprised in the first sub-pixel group and the plurality of sub-pixels comprised in the second sub-pixel group are located in different rows;

wherein the plurality of sub-pixels comprised in the first sub-pixel group are located in different rows, and the plurality of sub-pixels comprised in the second sub-pixel group are located in different rows;

wherein the plurality of sub-pixels comprised in the first sub-pixel group are located in odd-numbered rows, and the plurality of sub-pixels comprised in the second sub-pixel group are located in even-numbered rows;

wherein the pulse amplitude modulation module comprises:

a first driving transistor, wherein a control end of the first driving transistor is electrically connected to a first node, an input end of the first driving transistor is electrically connected to a second node, and an output end of the first driving transistor is electrically connected to a third node;

a first data transistor, wherein the control end of the first data transistor is electrically connected to a first scan line, the input end of the first data transistor is configured to receive the pulse amplitude modulation voltage, and the output end of the first data transistor is electrically connected to the second node;

a first compensation transistor, wherein the control end of the first compensation transistor is electrically connected to the first scan line, the input end of the first compensation transistor is electrically connected to the third node, and the output end of the first compensation transistor is electrically connected to the first node;

a first switch transistor, wherein the control end of the first switch transistor is electrically connected to a corresponding light emission line, the input end of the first switch transistor is electrically connected to a first power supply end, and the output end of the first switch transistor is electrically connected to the second node;

a second switch transistor, wherein the control end of the second switch transistor is electrically connected to the control end of the first switch transistor, the input end of the second switch transistor is electrically connected to the third node, and the output end of the second switch transistor is electrically connected to a corresponding light-emitting device;

a first reset transistor, wherein the control end of the first reset transistor is electrically connected to a second scan line, the input end of the first reset transistor is electrically connected to a first reset line, and the output end of the first reset transistor is electrically connected to the first node; and a first capacitor, wherein a first end of the first capacitor is electrically connected to the first node, and a second end of the first capacitor is electrically connected to a second power supply end;

wherein the pulse width modulation module comprises:

a second driving transistor, wherein the control end of the second driving transistor is electrically connected to a fourth node, the input end of the second driving transistor is electrically connected to a fifth node, and the output end of the second driving transistor is electrically connected to a sixth node;

a second data transistor, wherein the control end of the second data transistor is electrically connected to a third scan line, the input end of the second data transistor is configured to receive the pulse width modulation voltage, and the output end of the second data transistor is electrically connected to the fifth node;

a second compensation transistor, wherein the control end of the second compensation transistor is electrically connected to the third scan line, the input end of the second compensation transistor is electrically connected to the sixth node, and the output end of the second compensation transistor is electrically connected to the fourth node;

a third switch transistor, wherein the control end of the third switch transistor is electrically connected to the control end of the first switch transistor, the input end of the third switch transistor is electrically connected to the second power supply end, and the output end of the third switch transistor is electrically connected to the fifth node N5;

a fourth switch transistor, wherein the control end of the fourth switch transistor is electrically connected to the control end of the third switch transistor, the input end of the fourth switch transistor is electrically connected to the sixth node, and the output end of the fourth switch transistor is electrically connected to the first node;

a second reset transistor, wherein the control end of the second reset transistor is electrically connected to a fourth scan line, the input end of the second reset transistor is electrically connected to the first reset line, and the output end of the second reset transistor is electrically connected to the fourth node; and a second capacitor, wherein the first end of the second capacitor is electrically connected to a corresponding frequency sweep line, and the second end of the second capacitor is electrically connected to the fourth node;

wherein display panel further comprises: a first gate driving unit, comprising a plurality of cascaded first gate driving circuits, the plurality of cascaded first gate driving circuits are electrically connected to the plurality of sub-pixels comprised in the first sub-pixel group; and a second gate driving unit, comprising a plurality of cascaded second gate driving circuits, the plurality of cascaded second gate driving circuits are electrically connected to the plurality of the sub-pixels comprised in the second sub-pixel group, wherein the plurality of sub-pixels located in a m-th row comprised in the first sub-pixel group are electrically connected to a m-th-stage first gate driving circuit via a corresponding first scan line, and the plurality of sub-pixels located in the m-th row comprised in the first sub-pixel group are electrically connected to a (m−1)-th-stage first gate driving circuit via a corresponding second scan line, wherein the plurality of sub-pixels located in a n-th row comprised in the second sub-pixel group are electrically connected to a n-th-stage second gate driving circuit via the corresponding first scan line, and the plurality of sub-pixels located in the (n−1)-th row comprised in the second sub-pixel group are electrically connected to a (n−1)-th-stage second gate driving circuit via the corresponding second scan line, where $m>0$ and $n>0$;

wherein the plurality of sub-pixels located in the m-th row comprised in the first sub-pixel group are electrically connected to the m-th-stage first gate driving circuit via a corresponding third scan line, and the plurality of sub-pixels located in the m-th row comprised in the first sub-pixel group are electrically connected to the (m−1)-th-stage first gate driving circuit via a corresponding fourth scan line; and the plurality of sub-pixels located in the n-th row comprised in the second sub-pixel group are electrically connected to the n-th-stage second gate driving circuit via the corresponding third scan line, and the plurality of sub-pixels located in the n-th row comprised in the second sub-pixel group are electrically connected to the (n−1)-th-stage second gate driving circuit via the corresponding fourth scan line.

8. The display device according to claim 7, wherein the plurality of pixel driving circuits comprised in the first sub-pixel group provide flow paths for corresponding driving currents at a first start time according to the first light emission control signals; the plurality of pixel driving circuits comprised in the second sub-pixel group provide flow paths for corresponding driving currents at a second start time according to the second light emission control signals, wherein within a time period corresponding to the first start time to the second start time, the pixel driving circuits of the plurality of sub-pixels comprised in the second sub-pixel group sequentially receive corresponding pulse amplitude modulation voltages and corresponding pulse width modulation voltages.

9. The display device according to claim 7, wherein the plurality of pixel driving circuits comprised in the first sub-pixel group generate corresponding driving currents at a first start time according to the first light emission control signals; the plurality of pixel driving circuits comprised in the second sub-pixel group generate corresponding driving currents at a second start time according to the second light emission control signals, wherein the plurality of pixel driving circuits comprised in the first sub-pixel group stop generating the corresponding driving currents according to the second light emission control signals at the second start time.

10. The display device according to claim 7, wherein each of the light emission lines extends along a first direction, and the plurality of light emission lines are arranged along a second direction; the display panel comprises a first display area and a second display area that are adjacent to each other along the second direction, the first display area comprises a plurality of consecutive rows of sub-pixels, and the second display area comprises a plurality of consecutive rows of sub-pixels, wherein the first sub-pixel group comprises the plurality of sub-pixels located in the first display area, and the second sub-pixel group comprises the plurality of sub-pixels located in the second display area.

* * * * *